United States Patent
Kennedy et al.

(10) Patent No.: US 7,149,285 B2
(45) Date of Patent: Dec. 12, 2006

(54) DYNAMIC, AUTOMATED DOUBLE-ENDED SYSTEM AND METHOD FOR TESTING AND QUALIFYING METALLIC TELECOMMUNICATION LOOPS

(75) Inventors: Michael F. Kennedy, Ojai, CA (US); Alan B. Lowell, Camarillo, CA (US); Clinton J. Wooton, Littleton, CO (US); Chong Yi, Ventura, CA (US)

(73) Assignee: Fluke Corporation, Everett, WA (US)

( * ) Notice: Subject to any disclaimer, the term of this patent is extended or adjusted under 35 U.S.C. 154(b) by 523 days.

(21) Appl. No.: 10/608,806

(22) Filed: Jun. 27, 2003

(65) Prior Publication Data

US 2004/0066913 A1   Apr. 8, 2004

Related U.S. Application Data

(60) Provisional application No. 60/415,634, filed on Oct. 2, 2002.

(51) Int. Cl.
*H04M 1/24* (2006.01)
*H04M 3/08* (2006.01)
*H04M 3/22* (2006.01)

(52) U.S. Cl. ............... 379/27.01; 379/21; 379/24; 379/27.04; 379/29.03; 379/30

(58) Field of Classification Search ......... 379/1.01, 379/9, 10.01, 10.03, 15.01, 21, 22.07, 23–24, 379/27.01, 27.04, 29.01, 29.04, 30, 32.04
See application file for complete search history.

(56) References Cited

U.S. PATENT DOCUMENTS

| 4,670,898 | A |   | 6/1987 | Pierce et al. ............... 379/22 |
| 4,764,949 | A |   | 8/1988 | Faith et al. ................. 379/9 |
| 4,841,560 | A |   | 6/1989 | Chan et al. ................. 379/29 |
| 5,592,528 | A | * | 1/1997 | Nelson et al. .............. 379/21 |
| 5,764,726 | A | * | 6/1998 | Selig et al. ................ 379/21 |
| 6,516,053 | B1 | * | 2/2003 | Ryan et al. ................ 379/21 |

* cited by examiner

*Primary Examiner*—Binh K. Tieu
(74) *Attorney, Agent, or Firm*—Allen, Dyer, Doppelt, Milbrath & Gilchrist, P.A.

(57) ABSTRACT

A multi-unit test system performs automated and dynamically alterable, double-ended testing of telephone lines, whose service is provided on copper cable pairs. A prescribed set of (e.g., twelve) individual tests are executed either from a hand-held measurement unit, or by a central office-resident direct access test unit, or by a collaboration of the two. The hand-held measurement unit and the direct access test unit exchange FSK-based test control messages with one another that are effective to cause a selected electrical condition to be applied to a first portion of the wireline and to cause a prescribed electrical measurement to be made at a second portion of the wireline.

21 Claims, 13 Drawing Sheets

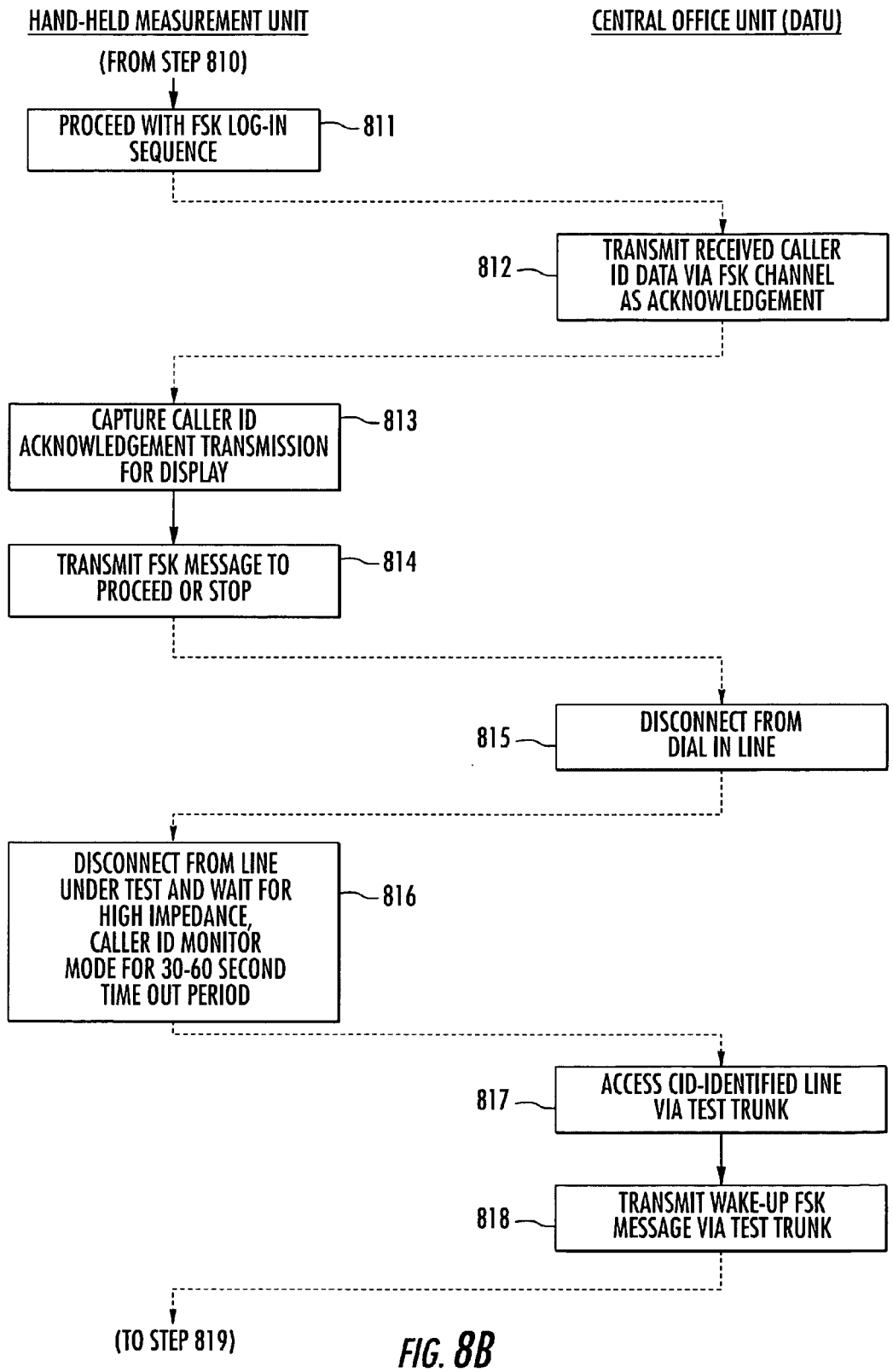

DYNAMIC, AUTOMATED DOUBLE-ENDED SYSTEM AND METHOD FOR TESTING AND QUALIFYING METALLIC TELECOMMUNICATION LOOPS

CROSS-REFERENCE TO RELATED APPLICATION

The present application claims the benefit of Provisional Application Ser. No. 60/415,634, filed Oct. 2, 2002, entitled: "Dynamic, Automatic Double-Ended Loop Testing and Qualification System and Method," by M. Kennedy et al, assigned to the assignee of the present application and the disclosure of which is incorporated herein.

FIELD OF THE INVENTION

The present invention relates in general to telephone line testing systems, automation of such testing systems and the reliability of their usage. The invention is particularly directed to a loop test methodology and system that is operative to perform automated and dynamically alterable, double-ended testing of telephone lines, whose service is provided on copper cable pairs. The invention is intended to be employed by telephone installation and repair technicians during the course of their quantifying and qualifying cable pairs for use by telephone line subscribers. Regardless of whether they are carrying voice, modem, fax or other data services, copper cable pairs all have a need for a noise and impairment-free connection from the service provider's point of origin to the customer premises. As will be described, the invention provides a new and improved double-ended system level solution that performs a prescribed set of (e.g., twelve) individual tests that are executed either from a hand-held unit or by a central office test unit or by a collaboration of the two, to assist service provider and service repair organizations, to successfully address the need to rapidly and effectively repair communication services carried on copper cable pairs and to carry out these functions in the face of ongoing advances in technology, coupled with a diminishing workforce with which to accomplish this formidable task.

BACKGROUND OF THE INVENTION

In the course of provisioning, qualifying, installing and repairing copper loops that make up today's telecommunications infrastructures, installation and repair technicians and other service provider personnel are required to perform a variety of tests, checks, and analyses on each copper loop. In many cases, these activities must be carried out repeatedly before services to a customer can be provided or reestablished. For reliability, it desired that service personnel be able to run the same suite of tests every time, in the same way, with the same criteria for pass and fail. Although there are currently a prescribed series of manual steps to be carried out, sometimes they are followed but sometimes they are not, which obviously leads to inconsistent results.

In order to accomplish these tasks, service personnel are often provided with extensive training that is intended to address not only the use of diagnostic equipment, but also appropriate methods and procedures to be applied to any number of specific circumstances. The vast majority of these test, checks and analyses are currently performed by a service technician whose is equipped with test equipment at one end, or one location of the loop under test. These methods, while useful for some testing, have inherent shortcomings that can affect the overall quality of the copper loop and, consequently, the services being delivered to the end customer. These methods are, in effect, 'open loop' solutions that fail to adequately provide metrics for total loop signal loss, undue power influence, circuit noise, circuit balance, overall resistive and capacitive characteristics and an accurate assessment of overall loop length. Moreover, following extensive training, mobile service personnel must each be equipped with costly diagnostic service equipment, in lieu of a system where diagnosis and management originate from a central location.

In a typical situation, the service technician will access the loop at a box on the side of the customer's premises, which is generally referred to as a Network Interface Device or NID, that allows the technician to isolate inside wiring and all the customer's phones from the regular phone line, because that is the point to which they are responsible. The technician will advise the customer to stay off their phone line and, when accessing the NID, the technician will also disconnect the customer premises inside and start testing from that point backwards, now knowing that the customer's equipment is not influencing the test measurements.

At this location the technician typically uses a hand-held meter to individually measure AC voltage, DC voltage and loop current. During each measurement, the technician has to select the dial position setting, make the reading and then physically generate a hard copy record of the reading. Although the technician is required to turn in the hard copy upon which the measurement readings were tabulated this does not always happen. If the measured loop current is above a prescribed value considered by the technician to be high enough (e.g. on the order of twenty milliamps) to proceed with further testing, he will set the test meter to a mode where it is static, and he can then use his butt set to bridge on the line, dial into central office test equipment, such as a SASS unit, or dial into a milliwatt 1004 Hz reference tone device, by inputting a DTMF key sequence to make that device send a 1004 Hz tone back at him. Once he hears a tone he switches his meter mode to 'measure loss', in an effort to measure the total loop loss of the line. Again, the technician reads the meter and he records the reading on a piece of paper.

If the results of the measurements are satisfactory, the technician will reassemble the connections and then run a further test to determine whether the problem is inside the customer premises or not, giving the customer the option to proceed at a given service charge. Most of the time the problem is not in the customer premises. Instead, the problem typically lies in the last major section of the copper cable plant which predominately, though not always, has been subdivided into two major sections, customarily referred to as facilities-one (F1) and facilities-two (F2). The F1 cable plant section corresponds to the bulky legacy wires coming out of the central office that have been wired for years. Sometimes this section of the cable has problems, but not often. On the other hand it has been found that the about eighty-five percent of the problems occur in the F2 section, since it is this section of the cable plant that is most often accessed and manipulated by service technicians. A not uncommon scenario is to effect a repair of one line in the F2 section, while simultaneously and inadvertently creating a fault (e.g., break) in another line in that section.

Although the technician will typically spend most of his time at the side of the customer premises, sometimes he will access the circuit under test at a relatively 'upstream' location, which may be a mile or two away at a crossbox distribution point, which is a farther back into the network.

If a measurement taken at this location is exceedingly high or above a threshold, most of the time the technician can fix it. However, sometimes, there is nothing the servicing personnel can do about it, due to excessive power influence in an area, for example there may be a thousand copper pairs going into one neighborhood that are not properly grounded. In this case, the technician will often back up one step and test five or six lines in an attempt to get a reasonable idea of what it is suppose to look like.

The hand-held meters currently employed either manually step through these operations or guide the user to manually step through them, in order to measure the loss. The user will call into a designated test location, which generates a milliwatt signal, a 1004 Hz reference signal, and measure that loss. The service technician then hangs up and goes back on hook with his butt set, placing the meter in quiescent mode, and dials into another device called a quiet termination device, which places a 600 or a 900 ohm termination across the line. The technician then places the meter in a mode called 'power influence' mode and measures the power influence on the line. The power influence is effectively longitudinal noise (to ground), which is converted from the tip and ring signal to the tip and ring ground signal. In addition, a measurement is made of metallic noise, which is the tip and ring conductor without the ground component. Both of those manual tests are performed via the meter at different times, and the technician is required to take the readings and record the readings on paper.

After this series of tests has been completed, the technician is supposed to manually subtract the noise measurement from the power influence measurement to provide a third reading called longitudinal balance. Once this has been done, the technician does not usually proceed any further. Unfortunately it has been found that in some instances technicians have failed to perform the power influence test and the longitudinal noise test, due to their lack of training as to how to make these measurements, what they mean and what to do about them. Although the steps of each of the testing procedures are documented, it turns out that for one reason or another they are not being performed—either due to lack of training lack of equipment or lack of experience to know what to do about a reading. Indeed, it is not uncommon to have a technician take a reading, and then make a guess as to whether it is within the 'ballpark' of a threshold, in order to assign a pass or fail status to the test. Presently the above process takes about eight minutes and is somewhat error prone because the technician is required to record the meter reading. Even when he does, as an example, the technician may look at the meter needle, see that it is it somewhere between 20 and 30, maybe a value of about 25 would be ok, and he writes that down.

The second part of the line test is something the technician can, but often doesn't perform. That is, he can call into an automated test system, or call a person who has access to an automated test system. The system is typically referred to as a mechanized loop tester or MLT, or it may be a direct access test unit or DATU. The loop tester accesses the telephone that one would like to test by either directly inputting the line number, or by capturing the phone number from the line the technician is calling from in the case of the DATU. This unit takes the telephone number that you want to test and tells the Central Office switching system to remove the line circuit electrically through a relay switch in the line card, so that the dial tone will go away from this line, allowing the line to be tested without the influence of 48 volts battery and any dial tone that might be provided in order to serve the customer, effectively making the line a dry line.

Although this part of the line test takes only about two minutes, queuing into the test system can take ten or fifteen minutes. It is one is one of the reasons that a speaker is provided on a butt set, as telephone technicians will call in and then proceed to wait in queue, so they turn their speaker on and hook the butt set out at the side of the road, and then clean their truck or do other things while they are waiting to get into the queue for testing. Even if they are the only one in queue, it typically can take two to three minute test time.

From an MLT perspective, the DATU will take the battery off of the line and perform some basic voltage resistance, capacitance readings to tell approximately what the length of the line is based on capacitance, how much DC voltage there is, how much AC voltage there is, if any, and a resistance reading to determine if there is any resistive leakage on the line. This constitutes the central office part of the test system. As pointed out above, it usually requires a couple of minutes, or slightly longer if it is an extended line, like a digital loop carrier line where there is some additional signaling that has to happen.

Most telephone lines served out of the central office contain regular copper lines from the point they leave the central office to the point they get to the customer premises. Sometimes they are not. Sometimes they are lines called digital loop carrier (DLC) lines, which correspond to digital service transported over a T1 carrier link and then demultiplexed at the other end in the neighborhood before it arrives at the customer premises. Those tests take on the order of another 35–45 seconds to perform.

Unfortunately, there is currently no correlation between the first suite of manual tests that involve the technician dialing in with his butt set, doing a loss measurement, doing a noise measurement, and doing a power influence measurement, and the second suite of tests that involve dialing into again to the maintenance center and asking someone to preform a test. As a result, the second suite of tests may not be performed at all. The only tests performed are those of the first suite. The technician looks at it and he has five or six test results with which to decide if the line is going to be ok or not, or how to troubleshoot.

The second part of the test is like reading the manual; from a practical standpoint it is only performed when the technician has no answer and realizes he must call in and get someone else to remotely run another test on the line. At this point, the technician is dependent upon a person called a screener, who performs the test and sees the results displayed on a screen in front of him, so that he can tell the technician what it says. In some of the newer systems, the technicians can actually take a hand-held terminal and dial in on a modem line, if they can find one, and do that test for themselves and see the results on the screen. This usually takes about five minutes.

If one considers all of the above procedures, it can be seen that the technician has a half a dozen independent steps to perform and several phone calls to make via a very labor intensive process. Once all these tests have been completed, the technician is in possession of a substantial amount of information, but no one else has that information. There is no record of it anywhere unless the technician manually writes it down and attaches a paper copy to the trouble ticket when he turns it in. That is how test systems typically work today. Moreover, as noted above, many of the technicians do not really understand the results they see on their screen and what to do about them. The test usually requires between eight to twelve minutes of time, and it is a single-ended test.

In other words, only the technician in the field has the test results. Nobody else knows what he has done or what the results that testing are.

SUMMARY OF THE INVENTION

In accordance with the present invention, there is provided a new and improved automated, multi-unit telephone line testing system, that includes a hand-held line-interfacing, measurement unit that is employed by a servicing technician at a loop access location, and a central office resident direct access test unit, that is operative to communicate with the technician's hand-held unit, in a manner that allows dynamically alterable, double-ended testing of the telephone line being accessed by way of the hand-held unit.

The various tests and parameters (e.g., pass/fail criteria) associated with each test are programmable into the DATU. This allows the testing system to be dynamically adjusted to take into account the fact that operational metrics tend to vary on a geographic basis (e.g., noise parameters on a low humidity southwestern U.S. desert line can be expected to be different from those on a high humidity line in the southeastern U.S.)

As will be described, the hand-held measurement unit contains a prescribed arrangement of communication and test interface circuitry that is configured to be coupled to a telephone copper pair and is arranged to engage a personal digital assistant type device, such as a pocket personal computer, Palm Pilot type device and the like. The hand-held unit contains test control software, that instructs a technician how to use the system, including entry of password to access the test system, how to perform testing, and which buttons to click. It also displays test results and provides recommended analysis after a test is been performed.

The hand-held measurement unit contains a digital communication bus that is coupled to a standard dual universal asynchronous receiver transmitter (UART) unit one of which is used to drive the associated personal digital assistant and the other of which is available to drive an auxiliary input/output device, such as a printer. It may alternatively be used as a 'debug' interface to allow messages to be interfaced with a laptop computer to provide an indication as to test system operation. Its principal purpose is to drive a printer, as may be located in the service technician's truck. This allows anything that the technician sees on the PDA display to be sent to a printer.

The hand-held unit is connectable, via tip and ring ports to a copper pair, such as that which may be accessed at a network interface device or crossbox. The tip and ring terminals are coupled through a standard surge/overvoltage protection circuit to a multifunction test circuit, which contains an arrangement of controlled relays, buffer amplifiers and termination devices, that are controllably operated to perform selected measurement operations on the line under test. The primary function of the multifunction test circuit is to automatically perform the same basic meter readings that a regular meter would perform.

In accordance with a preferred but non-limiting embodiment of the invention, these include the following measurements:

a shorted tip-to-ring measurement,
an open line measurement,
reversing or swapping tip and ring,
shorting tip-to-ground,
shorting ring-to-ground,
terminating the line with a 430 ohm termination,
terminating the line with a 600 ohm termination,
DC/AC select,
Direct Access Arrangement (DAA) select,
Gain select,
DC resistance, and
Capacitance measurement.

Outputs produced by the multifunction test circuit output are digitized and coupled to a supervisory digital signal processor. Memory associated with the hand-held unit's supervisory processor store operational control software including, for example, that used for selective activation of the front end relay matrix within multifunction test circuit which termination to put on it, depending upon which measurement is being taken, and then to activate the A-to-D converter. A processor-controlled 'beeper' provides an audible indication to the technician that test sequence is stepping through its various components. In addition, a text massage is displayed that goes along with the audible indication.

An EE prom is used to store various initial reference parameters (e.g., thresholds) employed for the test sequence. These values accommodate the very first time the hand-held unit is powered up and it has not talked to a DATU yet. As such it does not have any pass/fail criteria thresholds for some of the readings, the hand-held meter mode readings it will do off line. This prom stores basic default factory settings for criteria that are used as a general template. The EE prom is also used as a utility storage for the unit serial number and date of manufacture.

As measurements are performed the supervisory processor performs an averaging algorithm on the measurement data. It then buffers the data after it taking a sufficient number of samples to make an accurate measurement, and alerts the technician that the measurement has been taken and it stops that part of the test. In addition to conducting measurements on the line, the hand-held unit's control processor is controllably operative to apply one or more prescribed stimuli (e.g., tones) to the line to be measured by the DATU.

Selective operation of the multifunction test unit is controlled by a prescribed set of control inputs. In accordance with the invention, there are two modes of control. One control mode corresponds to the user interface via the personal digital assistant, with the technician/user selecting operations, such as regular meter mode, wherein regular AC voltage or DC voltage is repeatedly measured for the presence of an anomaly. In this mode the hand-held unit drives the graphical user interface. In a second control mode, the system performs double-ended testing. One interface is the graphical user interface on the personal digital assistant, at which point the technician selects a double-ended test and is prompted for information. The hand-held unit takes the tip and ring leads where the line is being troubleshooted and drives the line off-hook, applies dry dial tone, and calls into the DATU unit in the central office to be placed in the double-ended test procedure.

In this mode, the hand-held unit's control processor will take in a user input and decide what kind of test is to be performed. In order to perform double-ended testing the multifunction test circuit of the hand-held unit is coupled to a number of interface circuits, one of which is a Special Information Tone or SIT/Call Progress Tone Detector. This tone detector allows the control processor to monitor any call progress tones that would be expected when making a regular phone call, dial tone, busy tone, re-order tone, the three beep tones received when a wrong number is dialed, or the user fails to dial a zero and receives a message that says that the call cannot be completed as dialed. All voice messages are preceded with a series of tones that can be automatically recognized.

The hand-held unit also contains a high impedance monitor amplifier, a DC load circuit, a loop current detector, and a ring detector. This set of components makes up what is generally referred to as a Data Access Arrangement (DAA), namely, interface and transformer line interface to a telephone line. This arrangement is necessary to be able to drive the telephone line off-hook, audio-couple signals on the line into the tone detectors and any other devices and let the DSP monitor what is happening on the line. When the user initiates a test, the control processor checks for over-voltages, so that it is safe to go off-hook; it activates the DAA to terminate the line, and looks for loop-current. It then activates the DAA select and bridges onto the phone line. At this point the unit is listening to dial tone, so that the SIT Call Progress Tone Detector is transmitting signals to the DSP advising it that it has dial tone, and it is allowed to dial.

A modem unit is responsible for performing dialing. In accordance with a non-limiting but preferred embodiment the modem may comprise a Bell 202 modem, which has all the capabilities of a regular 1200 baud modem, including the ability to look for events that happen on the line, detect ring detection, and also dial. This modem is used after qualified dial tone has been detected, to dial a phone call out from the hand-held unit to the DATU unit in the central office, which will begin the sequence of double-ended testing.

An benefit of using a modem such as a Bell 202 modem is that, unlike most 1200 baud modems, which use DPSK or QAM technology, the Bell 202 type modem uses frequency shift keying (FSK) technology, which is what is used for caller-ID signaling. For all central office switching systems and caller-ID boxes, there is only a burst of about four seconds in between ring signals to pass data. That period of time is not long enough for conventional modems to bring their scramblers and delta phase shift keying signaling up to speed, so that it is not enough time for all of that initialization to happen and a data message to pass. Frequency shift keying avoids such up front set up because there are no scramblers and no delta phase shift keying. The only requirement is a burst of a few hundred milliseconds after the phone stops ringing, that is sent from one end to the other, to effectively advise the unit to get ready to receive data. Caller-ID is readily accommodated in the 3 and ½ seconds between the ring signals.

To this end, once dial tone is detected with the SIT Call Progress Tone Detector the modem begins to dial the telephone number from the hand-held unit to the DATU in the central office. The DATU will answer that call, not knowing whether it is a call from a hand-held test unit from an individual using a telephone calling in and desiring to use our conventional voice mode. The DATU part of the system communicates with multiple users. For the present case of a test operation, the DATU communicates with the hand-held unit. As will be described subsequently, it is also possible to dial into the DATU in voice mode, so that the user can be prompted if he does not possess a hand-held device. In this alternative mode, the DATU can ask the user what test is to be performed. While this is not as powerful as the double-ended, hand-held testing mode, it at least possesses a basic set of test functionality. When the DATU unit in the central office answers the phone call that has gone out over the tip and ring terminals, it provides a tone. The Call Progress Detector sees that tone, knows that it has made a call to the DATU and alerts the control processor to begin signaling between the hand-held tester and the DATU.

There is anywhere between a four to ten character DTMF escape sequence that the hand-held unit sends. This is a prescribed DTMF sequence that tells the DATU that it is about to be connected with the hand-held unit. When the DATU hears the particular DTMF escape sequence, it realizes that it is going to begin an FSK data transmission session. This FSK session provides all the data that the technician has entered on his screen, his password, who he is by technician ID, and the particular button he pressed to indicate what his test request is. This information is assembled in a packet and the processor in the hand-held unit sends it to the FSK modem, which then sends a burst of data to the DATU as a log-in sequence. The DATU takes in the information, parses it and unravels it. It checks the technician's ID, checks the password, and checks to see if it is able to communicate with the hand-held this unit.

If it can satisfy the request, the DATU sends an FSK response to the hand-held unit's modem that acknowledges the request, and indicates that the user may log in, or is logged in, and provides an indication of the first step in a test routine called 'double-ended' testing. Until then, even though the technician has buttons on his PDA screen that says perform a test, the hand-held measurement device does not really know how to do it. It only knows that there is a set of finite steps that it will be told to perform, and that everything it will be asked to do, it is capable of doing, in other words, namely any or all of the functional tests.

All of these functions can be carried out as part of a multi (e.g., twelve) step testing sequence, but the hand-held unit does not need to know what the sequence is. The use of FSK signaling is how the hand-held measurement device is informed what the test sequence is, and provides the present invention with a very powerful and flexible capability, in that it is not limited to any specific set or order of tests. Testing is completely remotely programmable. This is particularly significant, as there are considerably more hand-held measurement devices in the field than there are central office test units to call into to perform tests with them. This avoids having to hard code a particular recipe of steps and associated thresholds. It also provides flexibility of adding or removing one or more steps from the double-ended testing routine via the DATU, thereby obviating having to recall hand-held units and reprogram them.

As pointed out above, the DATU unit itself is monitored in the central office and has a network connection to the telephone company's local area network, so that the DATU can be programmed from a external website. This allows a user to access an associated website, examine what the current testing sequence is, and then decide whether to add another step. As a result, the next time a technician calls in and hits the test button, the test sequence could be different. Thus FSK signaling greatly facilitates communicating updates to the test sequence from the DATU to the hand-held unit.

There are several components of the DATU—hand-held unit messaging scheme. A first is which test step number is being performed. The second is what function the DATU is to perform. A third is what part the hand-held unit is to perform. A fourth element is how long each device is going to perform that function—a measurement or a signal; and a fifth component is the amount of time the test is to be performed, for which a pass/failure indication is sent. There may also be several other elements at the end of the packet that say how the analysis should be performed. All of this information is sent through the FSK channel. Every dual end functional test includes, at a minimum, the above-described components. Once the multicomponent DATU—hand-held unit communication has been sent and acknowledged, the DAA circuitry is taken off line and the multifunction test unit in the hand-held unit is bridged onto the line.

The DATU within the central office has a complementary architecture to the hand-held unit including a front end signaling section, which it also has to get off of the line so that it can generate the opposite function to that performed by the hand-held unit. For this purpose, the DATU has a digital-to-analog converter and an associated tone generator that allows either end of the line to perform either the tone generation or tone measurement function. The received communication is a set of FSK messages between the DATU and the hand-held unit that informs which unit will apply a prescribed stimulus and which unit will conduct a measurement on the line in response to that stimulus.

The architecture of the DATU unit selectively combines features of three technologies. A first is that of a conventional DATU, into which a technician can call with a buttset or a telephone, using the DTMF keypad to put in their password, the telephone number they wanted the DATU to get access to, and what function they would like it to perform, i.e., open the line, short the line, put a tone on the line. Once the telephone line was driven to a known state the technician would manually perform the test with a meter. A second is a complementary product called SASS, which has a similar interface where the technician may dial in and get a voice message. There is a voice controlled user interface that the user dials using their DTMF keys and those functions are things that would happen on a working line. A third is a remote test unit (RTU), which resides in the central office much like the DATU. However, rather than transform conditions for a user who has dialed in, the RTU's function is to actually make measurements, and inform the user the results of those measurements. Measuring AC voltage, DC voltage, capacitance, resistance and the like are included.

The DATU half of the double-ended testing architecture of the invention contains a primary test bus arranged to be coupled to North American Local Area Transport (LATA) Switching System Generic Requirements (LSSGR) trunks (referenced as Trunk T and Trunk R). This is a test Trunk interface that allows metallic access to a line, that is, it allows a piece of automatic equipment to take the line circuit out, remove dial tone which that line is providing, remove the 48 volts in battery signal which that line circuit provides to the customer, isolate the telephone line, and put it on test bus that daisy-chains its way through a central office switching system.

It is through the test bus that a connection can be made when the hand-held unit first dials in, to a voice user, or to one of the special test trunks that allow metallic access. Control of the DATU is carried out by a supervisory control processor that controls an auxiliary test module unit, a standard test pack unit, and an extended test pack unit. The standard test pack unit and the extended test pack form what is typically termed in the industry as a remote test unit, or test head, often referred by the regional Bell operating companies as a local test system (LTS). This system is customarily used to perform testing from a maintenance administrator, to decide whether or not to dispatch a technician to fix a line at a remote location, or whether the problem is a linecard in the central office.

The standard test pack unit performs measurements that require a small amount of voltage, typically below 6 volts. As a non-limiting example, the standard test pack may be used when sweeping the line to look for load coils or bridging onto a line that might be busy. The standard test pack unit performs initial DC voltage readings and makes an assessment as to whether the extended test pack unit needs to come on line and do something further. The extended test pack unit performs higher voltage readings, up to 100 volts. Its function is to perform standard voltage, terminal voltage readings, e.g., tip-to-ground, ring-to-ground, and tip-to-ring. It provides an indication of what the terminal voltages are, typically up to a value on the order of 100 volts. It can also perform a resistance measurement, as well as a leakage measurement, which, as noted above, corresponds to a resistance in the presence of 96 volts battery. Namely, under processor control, the extended test pack applies 96 volts to the test bus and then activates its internal resistance measurement circuitry to perform a leakage measurement.

The extended test pack is also responsible for performing a conventional capacitance measurement to determine how long the line is. To measure capacitance, a 30 hertz signal may be coupled to the test bus from the extended test pack, which then measures the envelope and the magnitude of the reflected signal. From these measurements raw capacitance numbers are derived in terms of capacitance from tip-to-ground, ring-to-ground and tip-to-ring conductors of the line. These values are then applied to a standard conversion formula in terms of a prescribed capacitance factor per mile, to derive a distance measurement from the end of the line.

In the case of the present invention, in addition to making measurements, the results are reported. For this purpose, the supervisory control processor is coupled with a terminal server to a local area network (LAN). In addition to reporting the measurement result, the processor will report whether the unit is being driven from a terminal test mode, or whether it is being driven by the hand-held unit.

In addition, an FSK message will be transmitted to the hand-held unit of the performance of the capacitance measurement, with results for display on the user's PDA. After the capacitance test is performed the DATU performs a leakage test, which derives an indication of distance based on the resistive length of the line. This measurement is important as it involves double-ended testing with use of the hand-held unit, which performs a function like shorting the tip and ring terminals. By shorting the tip and ring terminals from the hand-held device, and then have the DATU perform a resistive measurement, the resistance from the hand-held unit to the DATU can be determined.

The extended test pack is a particularly useful measuring tool since it has the ability to measure the loop length of the line based on both resistance and capacitance. While such measurement techniques are conventional, what is particularly beneficial in terms of the present invention is the fact that the measurement data is being delivered over the FSK channel to the hand-held unit for display on the user's PDA screen.

Coupled between the standard test pack unit and the test bus is a 'build out' circuit. The purpose of this circuit is to simulate or provide an on-board reference of a loaded loop (a load coil and a build out capacitor), which is predominately associated with a United States telephone network topologies. The build out circuit enables the DATU to know many loads there are, how far away the first one is, the millihenry value and the spacing between them, so that the DATU is able to provide a map of what the loading looks like, both in millihenries and in 1000's of feet. The build out circuit is used during calibration and as a reference interface for a loaded loop. It is connected to the standard test pack since one of its primary functions is to perform a load coil sweep. In order to perform a load coil sweep, it has to know whether or not the build out circuit is in place or not.

The auxiliary test module is a processor-based unit that is operative to implement various telephone functions that must be performed during the course of testing a line that a test package does not perform. The auxiliary test module is responsible for detecting dial tone, detecting special information tone, dialing, ringing tone, busy tone, and taking appropriate steps as well as performing any tone generation. The auxiliary test module is controlled by the supervisory control processor.

Access between test bus and the auxiliary test module is afforded by tip and ring leads. The auxiliary test module can access both the dial in line from the DATU to perform functions such as generating reference tones, as well as performing functions on the metallic test bus tip and ring. It can also connect to in the outside world as compared to the extended test pack unit and the standard test pack unit. The auxiliary test module contains circuitry that is complementary to that in the hand-held unit. It also has the ability to make a call to monitor an outbound call.

The DATU also contains an In/Out splitter comprising a relay matrix that is used exclusively for connecting the DATU's test bus to a particular telephone line in a particular mode. The matrix is preferably implemented by means of a set of relays and opto-isolators that allow a relay to be thrown in and look in one direction or the other. Coupled to the relay matrix is a set of signal leads for connecting the DATU to a particular line in a variety of different orientations, termed look-in, look-out, bridge busy test. These refer to the technician may want to look at a line making metallic access to a line. Thus, the in/out splitter under control of the supervisory processor is able to access a line in any desired mode.

The in/out splitter also allows metallic connections to be made to the line for different purposes for looking 'inward' at the disconnected line card that is providing dial tone. As noted above, the relay matrix of the In/Out splitter serves to connect the DATU to a particular line in a variety of different orientations, termed look-in, look-out, bridge busy test. These refer to the technician may want to look at a line making metallic access to a line. Look-in breaks the connection and looks inbound. In other words if there is a call on that line that call will be dropped. It is a brake before make. Look-out does the same thing, it breaks the connection and connects the DATU looking outbound. For look-in or look-out, both will drop the connection if the customer happens to be on the line.

For the next two, bridge and busy test, the DATU will not drop the connection; it will bridge on the line of an existing customer call and tell the auxiliary test module or the supervisory processor bridged on it that it has quietly bridged on the line, but did not disturb the traffic on the line, and asks what to do next. The next thing is to perform a busy test, which asks if the line really looks busy, or if there is a conversation on it, or if it is just that someone has gone off hook and left the receiver off hook. Thus, a function of the auxiliary test module is to look at conditions, such as those described above, and tell whether or not the line is actually busy. It takes a look at the DC voltage and it will also sample different increments to see if there is burst of speech on it.

The DATU also contains a processor-controlled multifunction unit that provides an interface for communications with the DATU in the central office. When used in conjunction with the hand-held unit which may be coupled to a line at a customer premises, what results is a fully automated double-ended test procedure that allows signaling over the same telephone line under test in a step sequence with some timing that gets exchanged between the two units, so that they controllably step back and measure at the same time, and then come back and signal at the same time.

As will be described the DATU's multifunction unit includes voice processor capability to alert the user if he dials in and puts in the correct password sequence. Instead of performing a double-ended sequence the technician is told what to do what to do next. The multifunction unit may also voice out to the technician what functions on his DTMF touchtone keypad should be used to execute given functions. Similar to the hand-held unit, tip and ring ports are coupled through secondary protection circuits to a loop current detector, a DC load and a ring detector. Downstream of the ring detector is a caller ID detector which is used to identify from what number a technician has placed a call from the hand-held unit. As pointed out above, the unit also captures the name of the record and displays it if it is there. Once that has happened, the DATU will go off hook, so that it terminates the line, connecting a two-wire to four-wire interface, which provides AC coupling to the line.

AC-coupling, whether audio, tones, or DTMF signaling is coupled through a bus containing an audio transmit path and an audio receive path. Signals sourced from within the unit are transported out over the audio transmit path; incoming or received signals are conveyed over the audio receive path. The audio receive path is coupled to a DTMF receiver, an FSK transceiver (which is connected to both the transmit bus path and the receive bus path), and a call progress detector. The audio transmit path is coupled to a voice synthesizer, the FSK transceiver, a tone buffer and a scrambled audio monitor. These components are employed to perform the twelve-step test, so that when the hand-held unit is taking its signaling section off the line, the DATU is taking its signal off the line.

The FSK transceiver in the DATU serves the same purpose as in the hand-held unit. The voice synthesizer is used to generate voice instructions should there be no double-ended test call from the hand-held unit. The DTMF receiver and the call progress detector operate in the same manner as in the hand-held unit. The Tone buffer is used to generate specific tones independent of the auxiliary test module.

The scrambled audio monitor circuit has two pathways; one is outbound on the audio transmit bus path, so the person on the telephone can hear what is going on, and it has an inbound connection to a test bus. The test bus corresponds to a North American LSSGR test trunk. In this way a connection can be made metallically to the line under test in a bridged mode, and audio traffic on the line can be monitored, while the one using the DATU can hear it. The audio is scrambled so that the listener cannot determine what is being said, but a determination can be made whether there is a conversation on the line, or whether the line has a tone on it. This allows a determination to be made as to whether the phone user has taken his receiver off hook and left it that way, or if the line is busy but there is no audio on it at all, which usually indicates a fault condition. It should be noted that the scrambled audio monitor is not used in conjunction with the double-ended tester, since it is a voice mode only function.

A test bus interface bridges this circuitry onto the trunk tip and ring pair. Coupled with the test bus is an access unit containing a standard overflow unit and a B-lead unit, which are used in conjunction with a coin unit, containing a 130 volt power supply and a pair gain test controller (PGTC) current sense unit. After sending it a 130 volt pulse, it may send back a signal back from a test controller which is sensed by the current sense unit. The PGTC current sense unit will sense AC signals, both tones and DC voltages, under control of the supervisory processor. The overflow unit and the B-lead unit monitor different signals on the test trunk and provide a status back to supervisory processor indicating whether overflow situation was detected which is a different signal in the cells. Most of the time this means that access to the line is prevented. It is served out of another central office of someone receiving a number wrong.

The DATU also includes RAM that stores a series of tables, which are controlled either through a local terminal interface on a laptop computer through a local serial port to one of the DATU UARTs, or over the local area network connection. The DATU can be queried as to what is in the table and the DATU can be supplied with new data for storage in the table. That is how the testing sequence is controlled. A table can be programmed with prescribed information, such as the next step in a sequence, what step is currently being exercised, what the hand-held unit is to do, and for how long, pass/fail criteria and which analysis method will be used. When a loaded test is performed an indication is given of whether or not there are any loads. This is not a pass/fail analysis, since in the real world one can encounter a line that loads and passes, or one can encounter a line that does not have loads and passes. Most telephone companies today want to know if they have a load, since they cannot sell DSL service to without taking the loads out. The invention is able to determine if the line has a load but can be readily used for simpler service such as dial tone and long distance.

Steps carried out by the hand-held unit and the DATU in the course of their setting up a test communication sequence are as follows. Initially, the technician connects the hand-held unit to the line under test. Next, AC and DC line voltages are measured. The line is then driven-off hook, and loop current is measured and recorded. Dial tone is then qualified and the DATU access number is dialed from the hand-held unit. Once the DATU access number has been dialed, the hand-held unit monitors the call progress tones including SIT tones described previously.

Next, the DATU detects a ring-in signal from the hand-held unit and captures the caller ID. It then trips ringing after receipt of caller ID and prior to the second ringing signal. Next, the DATU generates a 350/440 Hz dial tone for a period of 500 ms. The hand-held unit dials the DTMF escape sequence, which is received by the DATU. The hand-held unit then initiates an FSK log-in transmission during the 500 ms silent period; otherwise the DATU will proceed with a voice mode access sequence. The DATU then transmits the received caller ID data via the FSK communication channel to the hand-held unit as an acknowledgement of the access request, and the hand-held unit captures the caller ID FSK transmission for display on the technician's PDA screen.

An FSK message is then sent to proceed or terminate, and the DATU disconnects from the line. Next, the hand-held unit disconnects from the line under test and proceeds to wait in high impedance monitor mode, for a prescribed time-out period (e.g., on the order of 30–60 seconds). The DATU then accesses the CID identified through the test trunk and may have to retry if it encounters a busy line, as the hand-held unit may receive another call between its disconnect and access of the DATU. The DATU then transmits a wake-up message via FSK signaling over the test trunk.

Next, the hand-held unit activates a 600 ohm termination and transmits an acknowledgement to the DATU via the FSK signaling channel. It then begins stepping through a hand-held unit-to-DATU interactive automated test session.

The DATU continues stepping through the automated test sequence by providing the appropriate condition or measurement required. Similarly, the hand-held unit continues stepping through the automated test sequence by providing the appropriate condition or measurement required.

Following completion of the automated test, the DATU transmits measurement test results over the FSK channel to the hand-held unit. Also, the hand-held unit transmits measurement test results over the FSK channel to the DATU. The DATU then transmits an acknowledgement and disconnect message. Also, the hand-held unit displays information to the technician and disconnects from the line. Finally, the DATU disconnects from the test trunk and stores various parameters, including CID number, name, date, time, technician ID, password used, and hand-held unit model number.

The respective components of the twelve-step test sequence that are carried out between the hand-held unit and the DATU within the interactive automated test routine described above are as follows. Initially, the hand-held unit connects to the line under test and measures and records the AC voltage. This serves as an 'AC voltage' test No. 1. Next, the hand-held unit measures and records the DC voltage. This constitutes a 'DC voltage' test No. 2. The hand-held unit drives the line under test off-hook, and measures and records the loop current. This constitutes a 'loop current' test No. 3.

The DATU-to-hand-held unit interactive portion of the test begins with the hand-held unit dialing in and log in to the DATU. It requests the auto test, disconnects and waits for a DATU acknowledgement message via the test trunk connection. It then begins the interactive auto test. The first step of this test requires the DATU to generate a 1004 Hz tone signal for a prescribed period of time (e.g., a one milliwatt tone for 3 seconds). The hand-held unit then measures and records the loss for the generated tone. This constitutes a 'loss' test No. 4.

Next, the DATU activates a quiet termination for five seconds. In response thereto, the hand-held unit measures and records power influence. This constitutes a 'power influence' test No. 5. The hand-held unit also measures and records circuit noise. This constitutes a 'circuit noise' test No. 6. The hand-held unit then subtracts the circuit noise from the power influence values to calculate and record balance. This constitutes a 'balance' test No. 7).

Next, the hand-held unit provides an open line for a prescribed period of time (e.g., eight seconds). This allows the DATU to perform capacitance tip-to-ring, tip-to-ground, and ring-to-ground measurements. These values are recorded and correspond to a 'capacitance measurement' step No. 8. The hand-held unit then provides a tip-to-ring short for a prescribed time interval (e.g., four seconds). This allows the DATU to measure and record tip-to-ring resistance. This constitutes a 'resistance measurement' step No. 9. Next, the hand-held unit provides tip and ring ground for a prescribed time interval (e.g., four seconds). This allows the DATU to measure and record tip-to-ground and ring-to-ground resistance. This constitutes a 'resistance measurement' step No. 10.

The hand-held unit then delivers a warning to the technician that a high voltage test is about to be performed and provides an open line for fifteen seconds. In response, the DATU applies a high voltage (96 VDC) to the line. It then measures and records leakage from tip-to-ring, tip-to-ground and ring-to-ground. This constitutes 'stress' test No. 11. Finally, the hand-held unit opens the line, to allow the DATU to conduct a load coil detection. This constitutes the 'load coil' test No. 12.

BRIEF DESCRIPTION OF THE DRAWINGS

FIGS. 8A–8C are a flow chart depicting respective steps carried out by the hand-held unit and the DATU in the course of their setting up a test communication sequence.

DETAILED DESCRIPTION

Figure 1:
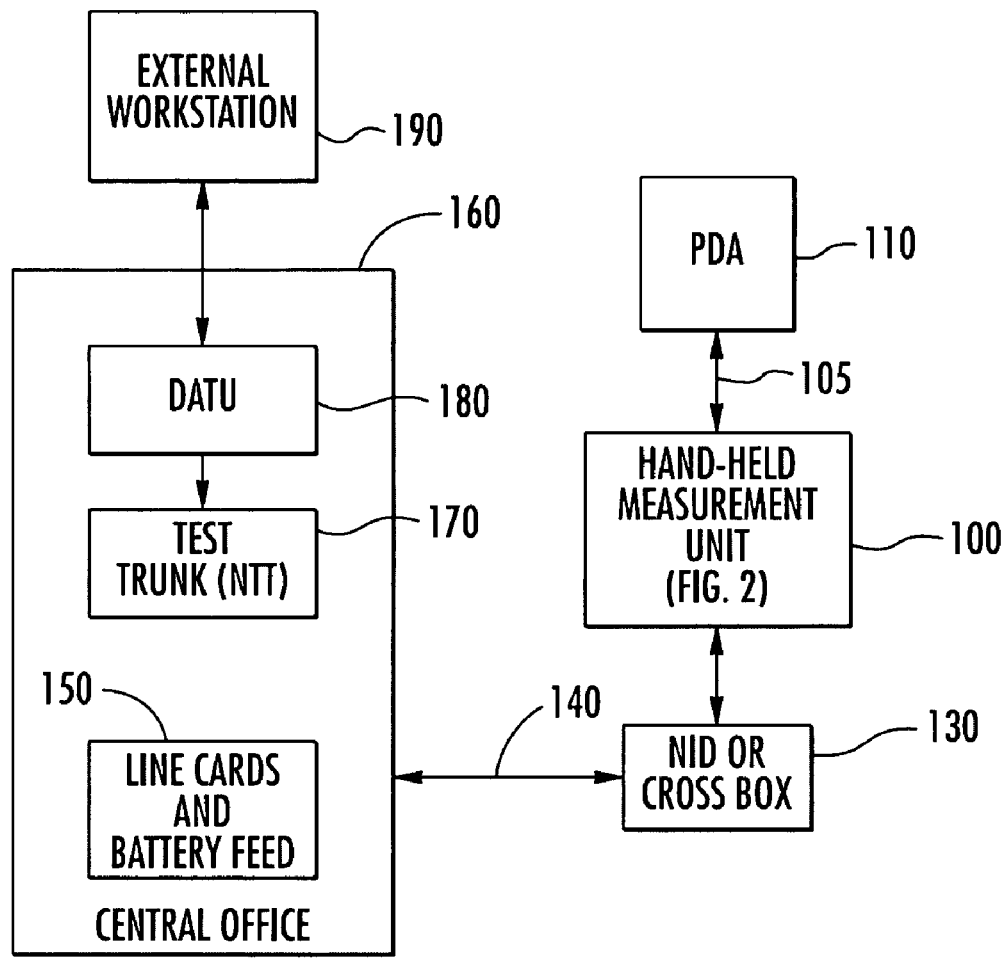
FIG. 1 is an overall block diagram of the dual ended test system in accordance with the present invention.

Before describing the automated double-ended telephone wire test system in accordance with the present invention, it should be observed that the invention resides primarily in a modular arrangement of conventional communication circuits and supervisory digital processing components, and an associated set of control software therefor. In a practical implementation that facilitates their being packaged in a hardware-efficient equipment configuration, these modular arrangements may be readily implemented as field programmable gate array (FPGA), or application specific integrated circuit (ASIC) chip sets.

Consequently, the configuration of such arrangements of circuits and components and the manner in which they are interfaced with other telecommunication equipment have, for the most part, been illustrated in the drawings by a readily understandable block diagrams, which show only those specific details that are pertinent to the present invention, so as not to obscure the disclosure with details which will be readily apparent to those skilled in the art having the benefit of the description herein. The block diagram illustrations are primarily intended to show the major components of the invention in a convenient functional grouping, whereby the present invention may be more readily understood.

Attention is now directed to FIG. 1, which is an overall block diagram of the dual ended test system in accordance with the present invention. As shown therein the invention comprises a hand-held measurement device or HMD 100 that is used by the craftsperson to perform testing of the line of interest. The HMD 100 to be described in detail below with reference to FIG. 2 contains a prescribed arrangement of communication and test interface circuitry that is configured to be coupled to a telephone copper pair and is arranged to be docked and mated (by way of a digital communication port 105, such as an RS-232 port as a non-limiting example) with a personal digital assistant PDA 110, for example a pocket personal computer, Palm Pilot type device and the like.

The PDA 110 contains test control software, to be described, that instructs a technician how to use the system, including entry of password to access the test system, how to perform testing, and which buttons to click. The PDA is also responsible for displaying test results to the user and provides any recommended analysis after the test has been performed.

As further shown in FIG. 1, the HMD 100 is connectable to a network interface device (NID) or crossbox 130, from which measurements on a selected copper pair, one of which is shown at 140, are to be taken and analyzed. The copper pair 140 is selectively coupled to components within the central office 160. The central office 160 includes line card and battery feed circuit 150 and a test trunk 170 to which a direct access test unit (DATU) 180 is coupled. The DATU 180 is arranged to be externally accessible and programmable via a workstation 190.

Figure 2:
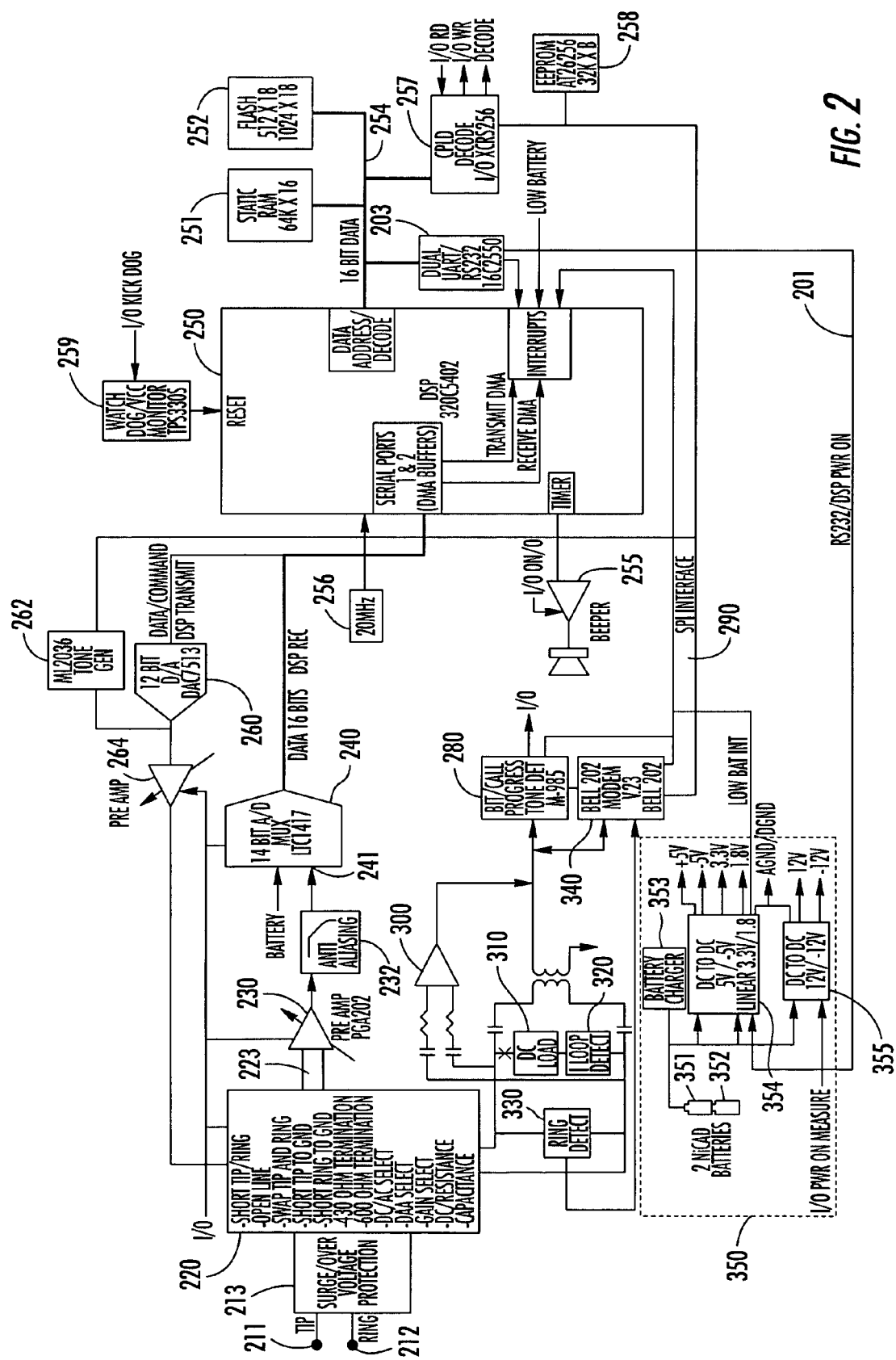
FIG. 2 diagrammatically illustrates the architecture of the hand-held measurement device of the dual ended test system of FIG. 1.

The hand-held measurement device 120 is shown in detail in FIG. 2 as comprising a digital communication bus 201 that is coupled with the above-referenced RS-232 port 105. Bus 201 is coupled to a standard dual universal asynchronous receiver transmitter (UART) unit 203, one of which is used to drive the HMD's associated PDA 110, and the other of which is available to drive an auxiliary input/output device, such as a printer. It may alternatively be used as a 'debug' interface to allow messages to be interfaced with a laptop computer to provide an indication as to test system operation. Its principal purpose is to drive a printer, as may be located in the service technician's truck. This allows anything that the technician sees on the PDA display to be sent to a printer.

As pointed out above, and as shown at the left hand side of FIG. 2, the HMD 100 is configured to be connectable, via tip and ring ports 211 and 212 that are readily attached (e.g., clipped) to a copper pair, such as that which may be accessed at a NID or crossbox. The tip and ring terminals are coupled through a standard surge/overvoltage protection circuit 213 to a multifunction test circuit 220. Test circuit 220 comprises an arrangement of controlled relays, buffer amplifiers and termination devices that are controllably operated to perform selected measurement operations on the line under test. These measurements are listed in the test circuit 220 and include the following:

a shorted tip-to-ring measurement,
 an open line measurement,
 reversing or swapping tip and ring,
 shorting tip-to-ground,
 shorting ring-to-ground,
 terminating the line with a 430 ohm termination,
 terminating the line with a 600 ohm termination,
 DC/AC select,
 Direct Access Arrangement (DAA) select,
 Gain select,
 DC resistance, and
 Capacitance measurement.

Thus, the primary function of the multifunction test circuit 220 is to perform the same basic meter readings that a regular meter would perform. Test circuit 220 has an output port 222 coupled to a preamplifier 230, the output of which is coupled through an anti-aliasing filter 232 to an input 241 of an analog-to-digital converter, multiplexer 240. Preamplifier 230 is operative to bring its input signal into the operational range of the analog-to-digital converter. The analog-to-digital converter is coupled to a supervisory digital signal processor DSP 250 (such as a Texas Instruments 320C5402 digital signal processor, as a non-limiting example). Processor 250 is driven by a prescribed reference clock, such as 20 megahertz clock 256.

DSP 250 has associated static random access memory 251 and flash memory 252 which are coupled with DSP 240 by way of a multibit data bus 254. These memory units contain the operational control software used by the DSP to control the operation of the HMD 100, including for example, selective activation of the front end relay matrix within multifunction test circuit 220, which termination to put on it, depending upon which measurement is being taken, and then to activate the A-to-D converter 240.

A decoder 257 is a standard bus programmable logic device decoder that makes sure the bus timing is correct on the address bus and the data bus. This allows peripheral devices, such as a Call Progress Detector 280 and a modem 240 to communicate with the software and get the date. A processor-controlled beeper 255 serves to provide an audible feedback to the user so that for every transition from a present test step to the next test step a 'beeper' tone will be generated to advise the user that the test sequence is stepping through its various components. In addition, the PDA display also provides a text massage that goes along with the audible indication.

An EE prom 258 is used to store various initial reference parameters (e.g., thresholds) employed for the test sequence. These values accommodate the very first time the hand-held unit is powered up and it has not talked to a DATU yet. As such it does not have any pass/fail criteria thresholds for some of the readings, the hand-held meter mode readings it will do off line. In other words, after the first time this device has talked to a DATU, it is told things like "an acceptable loop current value is 23 milliamps," so if asked to do a test and call into a DATU, and there are more then 23 milliamps on the line, that will be denoted as a pass and then proceed with the test. If there are less than 23 milliamps, it is marked as a failure, and it gets that threshold from the DATU. Until the first time this unit has talked to a DATU, it does not know that, so there are some basic default factory settings for all of those criteria that are used as a general template. These are stored in EE prom 258. EE prom 258 is also used as a utility storage for the unit serial number and date of manufacture. A watchdog timer 259 is used to reset the processor 250 should something happen to the software that is running in the unit. The software's job is to make sure that it pulses that signal periodically to keep the processor from going into reset.

The DSP 250 under software control will then DMA buffer those results. Through this process, the DSP performs a host of measurements over a period of time, e.g., tens of milliseconds, and then performs an averaging algorithm on the measurement data. It then buffers the data after it taking a sufficient number of samples to make an accurate measurement, and alerts the user that the measurement has been taken and it stops that part of the test. For this purpose, DSP 250 outputs a message via the DUAL UART 203 through the RS-232 port 105, so that a measurement result message is displayed on the technician's PDA 110.

DSP 250 is also coupled to the front-end circuit 220 so that it can generate tones so that the device on the other end can measure its signal level. For this purpose, DSP 250 is coupled to a multibit digital-to-analog converter 260, as well as a stand-alone tone generator 262, that feed a preamplifier 264, the output of which is coupled to the interface circuitry within the multifunction test circuit 220. The affords the present invention with the ability to source a test tone, for example, where the selected test is to generate a signal from the hand-held unit towards the other end of the loop, so that the DATU in the Central Office can measure the signal. In other words, in addition to conducting measurements on the line, the DSP 250 is controllably operative to apply one or more prescribed stimuli to the line. From a practical standpoint, however, in most cases, the hand-held unit will typically perform more measuring than signal generation, but it is still capable of signal generation.

As pointed out above, selective operation of the components of the front end test circuit 220 is governed with a prescribed set of control inputs. In accordance with the invention, there are two modes of control. One control mode corresponds to the user interface via the PDA 110 which is supplied through the RS-232 port, with the technician/user selecting operations, such as regular meter mode, wherein regular AC voltage or DC voltage is repeatedly measured for the presence of an anomaly. In this mode the HMD 100 provides the graphical user interface on the PDA.

In a second control mode, where the system performs double-ended testing, the first interface is the graphical user interface on the PDA 110, at which point the technician selects a double-ended test and is prompted for information. Here, the technician, instead of clicking the button that says over this RS-232 interface that the technician desires to stay local and not make any phone calls, but just measure a DC voltage, for example, which corresponds to meter mode, the technician performs double-ended testing. For this purpose, the HMD 100 takes the tip and ring leads where the line is being troubleshooted and drives that off-hook, applies dry dial tone, and calls into the DATU unit in the central office 160 to be placed in the double-ended test procedure.

In this mode, the DSP 250 will take in a user input and decide what kind of test is to be performed. One of these tests is a final test, which means that the user is about to close out this job, having concluded that the line is operationally satisfactory. There is also a loop test, which is really the same procedure as the final test with the exception of being marked as a troubleshooting scenario, and these are displayed on the user interface. There is also a five-step test, which is just a shortened version of it. For all of these tests the user selects an icon on his PDA screen, in response to which a message is transported over the RS-232 link, which tells the DSP 250 that it is necessary to call the DATU in the Central Office and begin a double-ended test.

In order to perform double-ended testing the test circuit 220 is coupled to a number of interface circuits, one of which shown at 280 is a Special Information Tone or SIT/Call Progress Tone Detector. This tone detector is a chip that allows the DSP 250 to monitor any of the call progress tones that would be expected when making a regular phone call, dial tone, busy tone, re-order tone, the three beep tones received when a wrong number is dialed, or the user fails to dial a zero and receives a message that says that the call cannot be completed as dialed. All of those voice messages are preceded with a series of tones that can be automatically recognized.

Thus, for example, the technician may use the PDA to instruct the line interface to go off-hook and dial the digits 1234. After some a period of time tones will be returned back from the network that say that the technician failed to dial a real phone number, so that the call cannot be completed. In this event, the DSP will send that text message up to the screen by virtue of recognizing the tones that come back from the Central Office. Call progress detection is used to look for dial tone, and to decide once the circuit has gone off-hook, that a call can be made. This is accomplished under software control through a Serial Peripheral Interface (SPI) 290, from the DSP 250.

Also shown in FIG. 2 is a high impedance monitor amplifier 300, a DC load circuit 310 a loop current detector 320, and a ring detector 330. This set of components makes up what is generally referred to as the Data Access Arrangement (DAA), namely, interface and transformer line interface to a telephone line. This arrangement is necessary to be able to drive the telephone line off-hook, audio-couple signals on the line into the tone detectors and any other devices and let the DSP monitor what is happening on the line. When the user initiates a test, the control software in the DSP 250 checks for over-voltages, so that it is safe to go off-hook; it activates the DAA to terminate the line, and looks for loop-current. It then activates the DAA select and bridges onto the phone line. At this point the unit is listening to dial tone, so that the SIT Call Progress Tone Detector is transmitting signals to the DSP advising it that it has dial tone, and it is now allowed to dial.

The modem unit 340 shown immediately beneath the SIT Call Progress Tone Detector 280 is responsible for performing dialing. As a non-limiting example, modem unit 340 may comprise a Bell 202 modem, which has all the capabilities of a regular 1200 baud modem, including the ability to look for events that happen on the line, detect ring detection, and also to dial. This modem is used after qualified dial tone has been detected, to dial a phone call out from the hand-held unit to the DATU unit in the Central Office, which will begin the sequence of double-ended testing. An aspect of using a modem such as a Bell 202 modem is that, unlike most 1200 baud modems, which use DPSK or QAM technology, a Bell 202 type modem is a 1200 baud modem that uses frequency shift keying (FSK) technology, which is what is used for caller-ID signaling. Also shown is a power section 350 containing a pair of series connected nicad batteries 351 and 352, a battery charger 353 and respective 5V and 12V DC to DC converters 354 and 355.

For all Central Office switching systems and caller-ID boxes, there is only a burst of about four seconds in between ring signals to pass any data. That period of time is not long enough for conventional modems to get their scramblers and their delta phase shift keying signaling up to speed, so that it is not enough time for all of that initialization to happen and a data message to pass. Frequency shift keying avoids all of that up front set up because there are no scramblers and no delta phase shift keying. Frequency shift keying is much simpler. The only requirement is a burst of a few hundred milliseconds after the phone stops ringing, that is sent from one end to the other, to effectively advise the unit to get ready to receive data. Caller-ID is readily accommodated in the 3 and ½ seconds between the ring signals. This same technology is used here.

To this end, after a dial tone is detected with the SIT Call Progress Tone Detector 280 under software control the Bell 202 modem 340 begins to dial the telephone number from the hand-held unit 100 to the DATU in the central office. The DATU will answer that call, not knowing whether it is a call from a hand-held test unit from an individual using a telephone calling in and desiring to use our conventional voice mode. The DATU part of the system communicates with multiple users. For the present case of a test operation, the DATU communicates with the hand-held unit. As will be described subsequently, it is also possible to dial into the DATU in voice mode so that the user can be prompted if he does not possess a hand-held device. In this alternative mode, the DATU can ask the user what test is to be performed. While this is not as powerful as the double-ended, hand-held testing mode, it at least possesses a basic set of test functionality. When the DATU unit in the central office answers the phone call that has gone out over the tip and ring terminals, it provides a tone. The Call Progress Detector 280 sees that tone, knows that it has made a call to the DATU and alerts that DSP 250 that is now time to begin signaling between the hand-held tester and the DATU.

There is anywhere between a four to ten character DTMF escape sequence that the hand-held tester sends. This is a prescribed DTMF sequence that tells the DATU that it is about to be connected with the hand-held tester. When the DATU hears that particular DTMF escape sequence, it realizes that it is going to begin a Bell 202 modem-based FSK data transmission session. This FSK session provides all the data that the technician has entered on his screen, his password, who he is by technician ID, and the particular button he pressed to indicate what his test request is. This information is assembled in a packet and the DSP 250 sends it to the FSK modem 340. The FSK modem sends a burst of data to the DATU as a log-in sequence. The DATU takes in that information, parses it and unravels it. It checks the technician's ID, checks the password, and checks to see if it is able to communicate with the hand-held this unit.

If it can satisfy the request, the DATU sends an FSK response to the Bell 202 modem that acknowledges the request, and indicates that the user may log in, or is logged in, and provides an indication of the first step in a test routine called 'double-ended' testing. Until that point in time, even though the technician has buttons on his PDA screen that says perform a full twelve-step test, or a five step test, or any of these tests, for any of these interactive tests, the hand-held measurement device 100 does not really know how to do it. What it does know is that there is a set of finite steps that it will be told to perform, and that everything it will be asked to do, it is capable of doing, in other words, namely any or all of the functional tests listed in the multifunction test unit 220, referenced above.

All of these functions can be carried out as part of a multi (e.g., twelve) step testing sequence, but the hand-held unit does not need to know what the sequence is. The use of FSK signaling is how the hand-held measurement device is informed what the test sequence is, and provides the present invention with a very powerful and flexible capability, in that it is not limited to any specific set or order of tests. Testing is completely remotely programmable. This is particularly significant as there are considerably more hand-held measurement devices in the field than there are central office test units to call into to perform tests with them. This avoids having to hard code a particular recipe of steps and associated thresholds. It also provides flexibility of adding or removing one or more steps from the double-ended testing routine via the DATU, thereby obviating having to recall hand-held units and reprogram them.

As pointed out above, the DATU unit itself is monitored in the central office and has a network connection to the telephone company's local area network, so that the DATU can be programmed from a external website. This allows a user to access an associated website, examine what the current testing sequence is, and then decide whether to add another step. This means that as soon as the website user hits the 'GO' or enter button on his PC, updating messages being propagating through all of the network of DATUs. As a result, the next time a technician calls in and hits the test button, the test sequence could be different. Thus FSK signaling greatly facilitates communicating updates to the test sequence from the DATU to the hand-held unit.

There are several components of the DATU—hand-held unit message scheme. A first is which test step number is being performed. The second is what function the DATU is to perform. A third is what part the hand-held unit is to perform. A fourth element is how long each device is going to perform that function—a measurement or a signal; and a fifth component is the amount of time the test is to be performed, for which a pass/failure indication is sent. There may also be several other elements at the end of the packet that say how the analysis should be performed.

Thus, considering a loss measurement test as a non-limiting example, which means the DATU will generate a 1004 hertz reference tone, that information will be included in the message. The same message will tell the hand-held unit that it is the hand-held unit's job to measure loss. Thus third part of that message may say that the loss is to be measured for four seconds. The fourth part of the message indicates the pass/fail criteria, e.g., 8 dbm. The fifth part of the message may inform the hand-held unit that if its analysis is anything higher than 8 dbm, such constitutes a failure, and anything lower than that value is a pass. All of this information is sent through the FSK channel, as described above. Every dual end functional test includes, at a minimum, the above-described components.

Once the multicomponent DATU—hand-held unit communication has been sent and acknowledged, the DAA circuitry used for this purpose, including the front end ring detector, DC load circuit 310, loop current detector 320, Call Progress Detector 280 and FSK modem 340 are taken off the line so that they are out of the way, since these signaling messages have been transported over the very same phone line that is about to be tested. Once the DAA circuitry is taken off line and, the multifunction test unit 220 is bridged onto the line by the DSP 250. As described above, the DSP knows what to do based on the contents of the test set up message it received (e.g., perform measurement function X for Y seconds). Thus, for Y seconds, it disconnects the DAA signaling circuitry and connects the measuring circuitry 220 to the line and performs the indicated measurement.

The DATU within the central office 160 has a complementary architecture to the hand-held unit of FIG. 2, including a front end signaling section which it also has to get off of the line so that it can generate the opposite function to that performed by the hand-held unit. For this purpose, the DATU has a digital-to-analog converter and an associated tone generator that allows either end of the line to perform either the tone generation or tone measurement function. The received communication is a set of messages between the DATU and the hand-held unit that informs which unit will apply a prescribed stimulus and which unit will conduct a measurement on the line in response to that stimulus. Once all the measurement is complete and the allotted time has expired, the hand-held unit stores the result of the measurement, and opens up the test path. As described above, it opens up the measurement circuitry and bridges back on the signaling circuitry without dropping the line. The hand-held unit then sends another message to the DATU that asks for the next step in the recipe, and provides the results from the most recent test it measured. The DATU stores that test result, looks up the recipe step in its memory bank and proceeds to the next step advising the hand-held unit what step is to be performed. This process continues for each of the steps described above, for each functional test that the DATU has programmed the hand-held unit to perform.

In addition to testing the line in the manner described above, there is a further test mode, where the DATU unit removes dial tone and battery voltage off the line. Originally as much testing as possible is conducted while dial tone and central office battery are still applied to the line. It is necessary to have that circuitry in place, when measuring loss, power influence noise and longitudinal balance with the customer's line in service from the Central Office standpoint. They are disconnected at the customer premises, but dial tone has not been taken off the line. This is because the entire loop loss through the Central Office switching system through that customer's line card is being evaluated and whatever noise is measured is what the customer will really hear. One of the results of this test could point to the fact that that particular line card in the Central Office that is supplying dial tone, has a problem with its CODEC or its front-end and it is actually generating the noise that the customer is complaining about. As a result, these tests have to be performed with the customer's circuit intact at the Central Office, not at their house. Thus, there are valid reasons for performing theses tests without taking the line out of service, and without taking the dial tone and battery away.

What cannot be measured are a number of other influences. If one part of the test is deemed satisfactory, if there is no excessive noise, no excessive loss, no excessive power influence to ground, the routine proceeds to the next part of the test. For this portion of the test, the hand-held unit is placed in a quiet mode, where all it has is the Bell 202 modem on the circuit, and is waiting for a return signal from the DATU. In this mode the output of the high impedance amplifier 300 is monitored.

Namely, once the various tests have been performed, the hand-held unit and the DATU exchange a recipe step that the hand-held informs the DATU with results from the last measurement, and then asks how to proceed. At some point in the multistep testing sequence, via a message from DATU to the hand-held unit, the hand-held unit is going to be disconnected and go into high impedance monitor mode and wait for an input from the user. To this end, the hand-held unit is preprogrammed to wait a fixed amount of time for that stimulus, before it aborts its waiting sequence and tells the user on the PDA's graphic user interface that there was no connection after the second part of the test from the DATU, so that it could not complete the tests, but here are the results obtained thus far. The PDA will display only the results of the first part of the test. This constitutes a failure scenario. In the more likely and typical scenario, the Central Office DATU unit will signal that all tests have been completed and results captured.

As pointed out above, part of the information transmitted from the hand-held unit will be identification and password information from the technician. When the Central Office DATU unit initially receives a call from the hand-held unit, it captures the caller-ID from the telephone line. As a result, in addition to knowing the technician's ID, the password that was included in the first message, the test request, and all the measurements that have been done to date, the DATU also knows the telephone number from which the hand-held unit is calling. Having captured this identification information is very useful for the following reason.

One of the reasons that conventional methodologies fail is the fact that the technician is required to make measurements on a line and record the results of a loss measurement, power influence measurement, and noise measurement on paper. Investigation by the present inventors has revealed that, in some cases, if the particular telephone line being used by the technician is not good enough to pass the test, the technician will simply go to another phone line and run the test on that line, so that he will know what the results are for a good line; he then records the results for a good line and terminates the job. The customer may initially think everything is satisfactory. However, in a relatively short period of time, the customer can be expected to call back and complain that the problem still exists. This is an albatross in the world of the telephone company—called a 'repeat'.

A repeat is one of few metrics that are used to measure the performance of a telephone company. While phone companies may be afforded significant latitude from public utility commissions as to what they can and cannot do, one of the things that they have to report to the state utility commission, is the 'repeat' rate. The repeat rate has to be below a certain level or service is not deemed appropriate. If the service not deemed appropriate, then a rate increase will not be granted. One of the primary benefits of this present invention is the fact that it provides an automatic way to reduce the repeat rate. In the present example, the repeat would be caused by a technician using a phone line to run a test and then taking those results and manually recording them for another phone line, saying the line operating satisfactorily when it is really not.

The capture of the phone line identification information in accordance with the invention serves to remedy this problem. When a phone call is made from the hand-held unit to the DATU, the DATU captures the telephone number, the caller-ID from which the service technician is calling and then sends that message along with the first recipe step back to the hand-held unit, so that the hand-held unit displays that information on the PDA screen. For example, the following message comes up: "you are calling from 321-123-4567, do you want to test this line?" In response to this message the technician clicks 'yes' or 'no' on the screen. Thus, it is clear to the technician what line he is on. This serves two purposes.

First, it serves as a validation for the technician, as he checks his trouble ticket to be sure he is on the correct line. Perhaps when he opened his crossbox he had 500 pairs of wire and instead of being on pair 99 he was on pair 98—wrong phone number. He gets off pair 98 and starts his test again. No harm done. Secondly, it allows the DATU in the Central Office to capture a record of what telephone number that this particular set of tests was performed on. This serves to track the test. The second reason for capturing the telephone number is that it obviates having to ask the technician what telephone number he is testing. When it comes time for the second part of the test when the DATU has to ask the switching system to take the linecard off line, and throw the relays to terminate battery and dial tone, the number is already known. Part of the request from the DATU to the Central Office switching system is "what telephone number do you want me to access for you, what linecard do you want me to throw the relay on?" the DATU has to tell the Central Office switch what telephone number. In the present system it does not have to ask the technician and it is not fooled by anybody, because it captured the phone number very early on in the sequence by the use of caller-ID.

When the DATU tells the HMD to go into quiet, high impedance monitoring mode, it takes the telephone number that it captured via caller-ID, which the technician had no influence over, and it tells the Central Office switching system to access this line and perform a metallic test truck access. This involves access to a set of several test busses, that daisy-chain their way through the Central Office switching system. In addition, there is a Test Trunk which allows certain equipment in the telephone Central Office, the DATU, or in some cases this MLT tester, which is what the test administrator uses, to get on that test bus with a particular line, take that line out of service and perform some voltage resistance capacitance tests. It takes about 20–30 seconds for the DATU to perform this function in conjunction with the Central Office switching system. This happens independently of what is shown in FIG. 2 and will be described in detail with reference to FIG. 3. What is relevant to the present discussion is the fact that that the hand-held unit is in monitoring mode, waiting for this sequence to happen. Once it happens, the DATU will send a tone burst over the connection, which the high impedance monitor circuit 300 needs to pass through to the SIT Call Progress Tone Detector 280.

The reason for this mode is due to the fact that if the DATU in the Central Office tries to access the line, and the inside is off-hook in the line, the line will appear to be busy, and the Central Office switch will not allow access to that line. Some Central Office switches, for example, those made by Northern Telecom, allow busy override on a call. This causes some inconsistencies. First it can be confusing if the hand-held unit is connected to the right line, but should the technician I butt into a phone conversation. Secondly, not every Central Office switching system allows this to happen. Sometimes it indicates that the line is busy, and that's the end of it. This would preclude performing the second part of the twelve-step test. It is for this reason that the high impedance monitor circuit is employed.

Even though testing is to continue, and from the user's perspective, it is still a one button push, the test is still proceeding along; at some point in the testing sequence, the high impedance monitor circuit and the hand-held unit have to be activated, so that the DATU can get up on what appears to be a not busy line. In other words, the line being measured has to appear as an idle phone line. When this, the DATU is now connected to this phone line and instead of the telephone company linecard sending dial tone out on this phone line that the hand-held unit can listen to, the hand-held unit is now talking directly to the DATU again via modem unit 340. It picks up right where it left off, over the same tip and ring terminal; now it monitors for what is called a ring burst. This is a 480, 620 hertz audible ringing tone, which the SIT Call Progress Tone Detector is programmed to detect. Thus, when the DATU makes connection to this pair of wires 211, 212 again, through the overvoltage protection circuit 213, multifunction test unit 220 and high impedance monitor 300, the Call Progress Tone Detector 280 hears the tone, and sends it to the DSP 250. The DSP 250 now knows, that the DATU has picked up the other side of the connection and the two units are now going to resume the twelve-step testing sequence begun earlier.

Once the tone is detected, the hand-held unit reactivates the modem 340, and sends an FSK message out that asks if the DATU is at the other end of the line. Then another FSK response comes back and the DATU unit in the Central Office, which identifies the DATU. Next, is the seventh step of the recipe, to carry on with the measurements as before.

At this point, most of what the DATU wants the hand-held unit to do is to put a condition on the line, typically corresponding to the first four to five functions listed for the multifunction test unit 220. Up until this point what has mostly been done involved the use of the hand-held unit, performing measurements with the DATU sending the stimulus out for the measurements to be performed. In other words, the DATU generates a 1000 hertz reference signal and the hand-held unit measures the loss, or the DATU generates a quiet termination and the hand-held unit performs a noise reading. This constitutes the first part of the test.

Now, in the second part of the test sequence, the DATU unit is going to perform a series of resistance voltage and capacitance readings, which require the hand-held unit to be in a known state. For this purpose, the next recipe message may indicate that the DATU's job is to perform a voltage reading, and the hand-held unit's job is to open the line and get out of the way so as not to influence the reading. A termination is maintained on the line but the hand-held unit does not make any measurements and does not put any circuitry on the line other than keeping the line terminated so it doesn't drop. Thus, the DATU proceeds through a series of steps for the next of the twelve-step test with the hand-held unit providing the stimulus.

The hand-held unit may short tip and ring together so that the DATU can take a loop resistance reading, or the hand-held unit may short tip and ring to ground, or short one side to ground so a ground resistance/leakage reading may be performed. A leakage reading may be considered a resistance reading while applying 96 volts of battery on the line. The DATU performs the measurements, with the hand-held unit typically generating a stimulus for the DATU to take those measurements.

Just as in the case when the hand-held unit was taking the measurements, a respective DATU-performed test is conducted for a fixed amount of time based on what the modem 340 message was, for example, indicating that the hand-held unit is supposed to open the line for five seconds, while the DATU performs a voltage reading. After the five seconds is up, they both bring their signaling sections back on line. Now instead of the hand-held unit providing a message that it has results, the DATU informs the hand-held unit that it has test results for display on the PDA screen.

The next step in the recipe is for the hand-held unit to open the line and the DATU to perform a capacitance reading. In other words, the two units work their way through this process until the last test is performed. The hand-held unit does not know it is the last test, nor does it know how many steps there are. The hand-held unit finally says it has performed the last step, which is a loaded test in the case of the DATU looking for load coils. All the hand-held unit needs to do is open the line and get out of the way. At that point the test is complete, but the hand-held does not know it yet. So the hand-held unit, after the final step, final wait time period, brings its signaling section back on line and requests the DATU to supply the next step in the recipe. When the DATU says there are no more steps, it requests a disconnect, and the testing is finished.

The hand-held unit then disconnects all of its circuitry, and send a message through the RS-232 interface to the user's PDA that displays all the results and whether the results are passing or failing. The DATU does the same thing on its side. But instead of displaying results on a PDA, the DATU sends a message over its Local Area Network that gets captured by a database, which is provided to a web site. Thus, at the same time that the technician sees his results, his results are available at the web site for examination by supervisory personnel.

It may be noted that the messages may be changed in a number of ways. One way is that they get a hard coded change in a table within the DATU unit, the table containing all of the test sequences, thresholds and particular criteria. In addition, there is a second criteria in the DATU if an Expert System feature is employed which will allow the DATU to make a decision in real time based on a previous measurement. For example, if a resistance is below 100 K ohms on one of 50 ground legs that ring the ground legs, a different troubleshooting scenario can be used to perform what is called a Resistive Fault Location. The hand-held unit does not know any different because all it is asking for is the next recipe step. It does not know whether it is the same one it did last time or a different one. If the Expert System in the DATU unit is activated, the DATU is allowed to dynamically change the test sequence and perform different testing.

Thus there are two testing scenarios from the standpoint of the DATU. One is the standard twelve-step test sequence, described above, which currently takes on the order of about two minutes to run. This standard test does not allow the technician to input the phone number so he can fool the system; also, it causes his password and his technician ID number that is programmed into his hand-held unit to be automatically sent for storage in the records and it gives him all of the same results as are now seen on the web page. If an Expert System is used, the DATU working in conjunction with the hand-held unit will do two things.

First, it will perform a different set of steps depending on the actual results of the measurements taken, and it may take a divergent path from its normal twelve-step sequence to a different testing scenario automatically, and automatically with the hand-held unit to assist the technician in troubleshooting the line. Secondly, there is a series of messages that are exchanged between the DATU and the hand-held unit that produce two screens on the hand-held unit. One is the analysis of the present situation and the recommended next step—what is recommended doing next. For example, it may be recommended to swap the line under test with another line, because it has been measured to have such a high resistive fault and the connection point is a very remote distance (e.g., 8000 feet) from it. If an expert system is employed in the DATU, it provides recommendations not only to the hand-held unit but it will present them on the web site as well.

Figure 3:
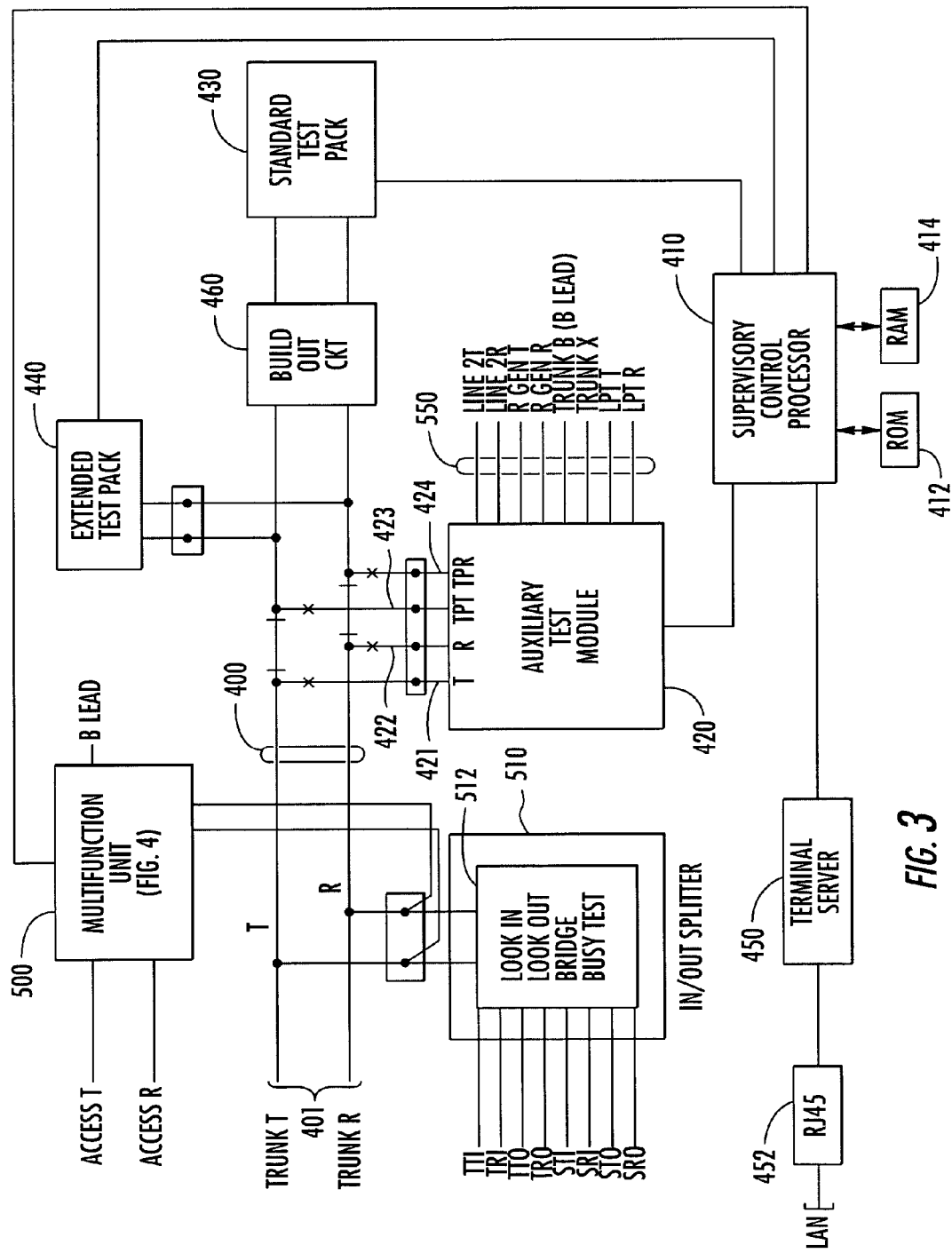
FIG. 3 diagrammatically illustrates the architecture of the central office resident DATU employed in the dual ended test system of FIG. 1.

Before detailing the architecture of the DATU unit in FIG. 3, it is useful to review the current state of the art upon which the DATU employed by the invention provides an improvement. The conventional DATU that has been produced by the assignee of the present application for the last dozen years or so has been a system into which a technician can call with a buttset or a telephone, using the DTMF keypad to put in their password, the telephone number they wanted the DATU to get access to, and what function they would like it to perform, i.e., open the line, short the line, put a tone on the line. Once the telephone line was driven to a known state the technician would manually perform the test with a meter.

There has also been a complementary product called SASS, which has a similar interface where the technician may dial in and get a voice message. There is a voice controlled user interface that the user dials using their DTMF keys and those functions are things that would happen on a working line. In other words, it was not desired for the device to take the line out of service to put a tone on it, or to put a short on it, or to open the battery, take the battery and ground off. These functions are more like "tell me what telephone number I am calling from," or "ring my phone back so I can test and make sure that this customer's phone rings."

In addition, the assignee of the present application currently offers a remote test unit (RTU), which resides in the Central Office much like the DATU. However, rather than transform conditions for a user who has dialed in, the RTU's function is to actually make measurements, similar to those contained within the twelve-step sequence described above, and inform the user the results of those measurements. Measuring AC voltage, DC voltage, capacitance, resistance and the like are included.

The architecture of the DATU unit of FIG. 3 selectively combines features of these three technologies in a manner that facilitates double-ended testing with the hand-held measurement unit, as well as reporting and access via an external node, such as a remote workstation or website. For this purpose, the DATU contains a primary (tip and ring) test bus 400, a first left-most end 401 is arranged to be coupled to North American Local Area Transport (LATA) Switching System Generic Requirements (LSSGR) trunks (referenced as Trunk T and Trunk R). This is a test Trunk interface that allows metallic access to a line, that is, it allows a piece of automatic equipment to take the line circuit out, remove dial tone which that line is providing, remove the 48 volts in battery signal which that line circuit provides to the customer, isolate the telephone line, and put it on test bus that daisy-chains its way through a Central Office switching system. (There is also a sleeve lead, which is basically a signaling lead.)

Within the test bus 400 an X represents a made relay connection, while a bar represents a relaxed relay connection. It is through the test bus that a connection can be made when the hand-held unit first dials in, to a voice user, or to one of the special test trunks that allow metallic access. Control of the DATU is carried out by a supervisory control processor 410 having associated read only memory 412 and random access memory 414, which store control software that runs on the processor, as in the hand-held unit. This supervisory control processor controls an auxiliary test module (ATM) unit 420, a standard test pack unit 430 and an extended test pack unit 440. The standard test pack unit 430 and the extended test pack 440 form what is typically termed in the industry as a remote test unit, or test head, often referred by the regional Bell operating companies as a local test system (LTS). This system is customarily used to perform testing from a maintenance administrator, to decide whether or not to dispatch a technician to fix a line at a remote location, or whether the problem is a linecard in the central office.

Within the LTS, the standard test pack unit 430 is used to perform measurements that require a small amount of voltage, typically below 6 volts. As a non-limiting example, the standard test pack may be used when sweeping the line to look for load coils or bridging onto a line that might be busy. The standard test pack unit 430 performs initial DC voltage readings and makes an assessment as to whether the extended test pack unit 440 needs to come on line and do something further. The extended test pack unit 440 performs higher voltage readings, up to 100 volts. Its function is to perform standard voltage, terminal voltage readings, e.g., tip-to-ground, ring-to-ground, and tip-to-ring. It provides an indication of what the terminal voltages are, typically up to a value on the order of 100 volts. It can also perform a resistance measurement, as well as a leakage measurement, which, as noted above, corresponds to a resistance in the presence of 96 volts battery. Namely, under processor control, the extended test pack applies 96 volts to the line through an ETP10 pin ribbon cable to the test bus 400, and then activates its internal resistance measurement circuitry to perform the leakage measurement.

The extended test pack 440 is also responsible for performing a conventional capacitance measurement to determine how long the line is. To measure capacitance, a 30 hertz signal may be coupled to the test bus from the extended test pack, which then measures the envelope and the magnitude of the reflected signal. From these measurements raw capacitance numbers are derived in terms of capacitance from tip-to-ground, ring-to-ground and tip-to-ring conductors of the line. These values are then applied to a standard conversion formula (in most cases for 24 gauge cable) in terms of a prescribed capacitance factor per mile, to derive a distance measurement from the end of the line.

In the case of the present invention, in addition to making measurements, the results are reported. For this purpose, the supervisory control processor 410 is coupled with a terminal server 450 access to a local area network (LAN) from which is readily provided by way of an RJ45 connector 452. In addition to reporting the measurement result, the processor will report whether the unit is being driven from a terminal test mode, or whether it is being driven by the hand-held unit.

In addition, an FSK message will be transmitted to the hand-held unit of the performance of the capacitance measurement, with results for display on the user's PDA. After the capacitance test is performed the DATU performs a leakage test, which derives an indication of distance based on the resistive length of the line. This measurement is important as it involves double-ended testing with use of the hand-held unit, which performs a function like shorting the tip and ring terminals. By shorting the tip and ring terminals from the hand-held device, and then have the DATU perform a resistive measurement, the resistance from the hand-held unit to the DATU can be determined. For example, if the capacitive length of the line is determined to be 10,000 feet, it is 10,000 feet, whether it is measured in the Central Office, at the half way point of the crossbox or at the side of the customer's house. If it is 10,300 feet, it is always 10300 feet.

If the technician is performing this test on the entire length of the loop at the side of the customer's house, and the resistive length measurement indicates a distance of only 4000 feet (yet the capacitive length measurement indicates a distance of 10000 feet), then the DATU knows it is not at the customer's house. This means that part of the circuit is not being tested. Thus, the extended test pack is a particularly useful measuring tool to employ in the DATU since it has the ability to measure the loop length of the line based on both resistance and capacitance. While such measurement techniques are conventional, what is particularly beneficial in terms of the present invention is the fact that the measurement data is being delivered over the FSK channel to the hand-held unit for display on the user's PDA screen.

Coupled between the standard test pack unit 430 and the test bus 400 is a 'build out' circuit. The purpose of this circuit is to simulate or provide an on-board reference of a loaded loop (a load coil and a build out capacitor), which is predominately associated with a United States telephone network topologies. In particular, after traveling some distance down a telephone line, the signal begins to fall off because of capacitive effects on the line. To counter this effect, a loading scheme is employed whereby, inductors are periodically inserted to cancel out the capacitive loading. That is commonly termed a loaded line. A typical practice of the Bell companies is to place an inductive load at the first 3000 foot distance and then every 6000 feet after that.

As described previously, one of the steps of the twelve-step sequence is to have the DATU sweep the line to determine whether or not any load coils are present. The use of a build out circuit enables the DATU to know many loads there are, how far away the first one is, the millihenry value and the spacing between them, so that the DATU is able to provide a map of what the loading looks like, both in millihenries and in 1000's of feet. The build out circuit is used during calibration and as a reference interface for a loaded loop. It is connected to the standard test pack 420, since one of its primary functions is to perform a load coil sweep. In order to perform a load coil sweep, it has to know whether or not the build out circuit 460 is in place or not.

The auxiliary test module (ATM) 420 is a processor-based unit that is operative to implement various telephone functions that must be performed during the course of testing a line that a test package does not perform. The ATM is responsible for detecting dial tone, detecting special information tone, dialing, ringing tone, busy tone, and taking appropriate steps as well as performing any tone generation. The auxiliary test module is controlled by the supervisory control processor 410.

Access between test bus 400 and ATM 420 is afforded by tip and ring leads. In addition to a standard pair of tip and ring leads, there is an additional pair of leads Test Pair Tip (TPT) 423 and Test Pair Ring (TPR) 424, that provide dual bus connectivity, where two test busses are employed. The ATM can access both the dial in line from the DATU to perform functions such as generating reference tones, as well as performing functions on the metallic test bus tip and ring. TPT and TPR leads can be employed to access a multifunction unit 500. The ATM 420 can also connect to in the outside world as compared to the extended test pack unit 440 and the standard test pack unit 430. The ATM contains circuitry that is complementary to that in the hand-held unit described above. It also has the ability to make a call to monitor an outbound call.

The multifunction unit 500, to be described in detail with referenced to FIG. 3, contains voice processor capability to alert the user if he dials in and puts in the correct password sequence. Instead of performing a double-ended sequence the technician is told what to do what to do next. The multifunction unit 500 may also voice out to the technician what functions on his DTMF touchtone keypad should be used to execute given functions.

Also shown in FIG. 3, to the left of the ATM 420 is an In/Out splitter 510. The In/Out splitter 510 comprises a relatively small card that contains a relay matrix 512 that is used exclusively for connecting the DATU's test bus 400 to a particular telephone line in a particular mode. The matrix 512 is preferably implemented by means of a set of relays and opto-isolators that allow a relay to be thrown in and look in one direction or the other. Shown to the left of the splitter 510 is a set of signal leads, TTI, TRI, TTO, TRO, STI, SRI, STO, SRO. The matrix 512 of the In/Out splitter 510 serves to connect the DATU to a particular line in a variety of different orientations, termed look-in, look-out, bridge busy test. These refer to the technician may want to look at a line making metallic access to a line. Thus, the in/out splitter 510 under control of the supervisory processor 410 is able to access a line in any desired mode.

What has been described up to this point has involved the used of the hand-held tester and performing a twelve-step test. The objective is to metallically connect to the line and look outward from the Central Office down the cable plant and all the way down the line to the customer's premises. The in/out splitter 510 also allows metallic connections to be made to the line for different purposes for looking 'inward' at the disconnected line card that is providing dial tone.

As pointed out above, the matrix 512 of the In/Out splitter 510 serves to connect the DATU to a particular line in a variety of different orientations, termed look-in, look-out, bridge busy test. These refer to the technician may want to look at a line making metallic access to a line. Look-in breaks the connection and looks inbound. In other words if there is a call on that line that call will be dropped. It is a brake before make. Look-out does the same thing, it breaks the connection and connects the DATU looking outbound. For look-in or look-out, both will drop the connection if the customer happens to be on the line.

For the next two, bridge and busy test, the DATU will not drop the connection; it will bridge on the line of an existing customer call and tell the ATM 420 or the supervisory processor 410 bridged on it that it has quietly bridged on the line, but did not disturb the traffic on the line, and asks what to do next. The next most logical thing is to perform a busy test, which asks if the line really looks busy, or if there is a conversation on it, or if it is just that someone has gone off hook and left the receiver off hook. Thus, a function of the ATM is to look at conditions, such as those described above, and tell whether or not the line is actually busy. It takes a look at the DC voltage and it will also sample different increments to see if there is burst of speech on it.

External connections for the ATM 420 are provided by a set of (TB4) leads 550. Within this set of leads there is a set of two tip and ring leads Line 2 T and Line 2 R. Leads RGEN T and RGEN R correspond to optional ring generation leads that can be used to ring the phone line after disconnected from it. This is accomplished by connecting an auxiliary external ring generator signal to bridge that signal through the ATM board and on to either bus to make the phone ring. Trunk B and Trunk X are associated with the North American LSSGR Trunks, referenced above. (North American LSSGR Trunks are a conventional four-wire trunk containing four leads: tip, ring, sleeve (or B), and ground (or X).) These four leads really make up a test trunk signal. The leads LPT T and LPT R comprise a spare tip and ring pair. As a non-limiting example, they may be used for connecting a dial-in modem to the Internet.

Figure 4:
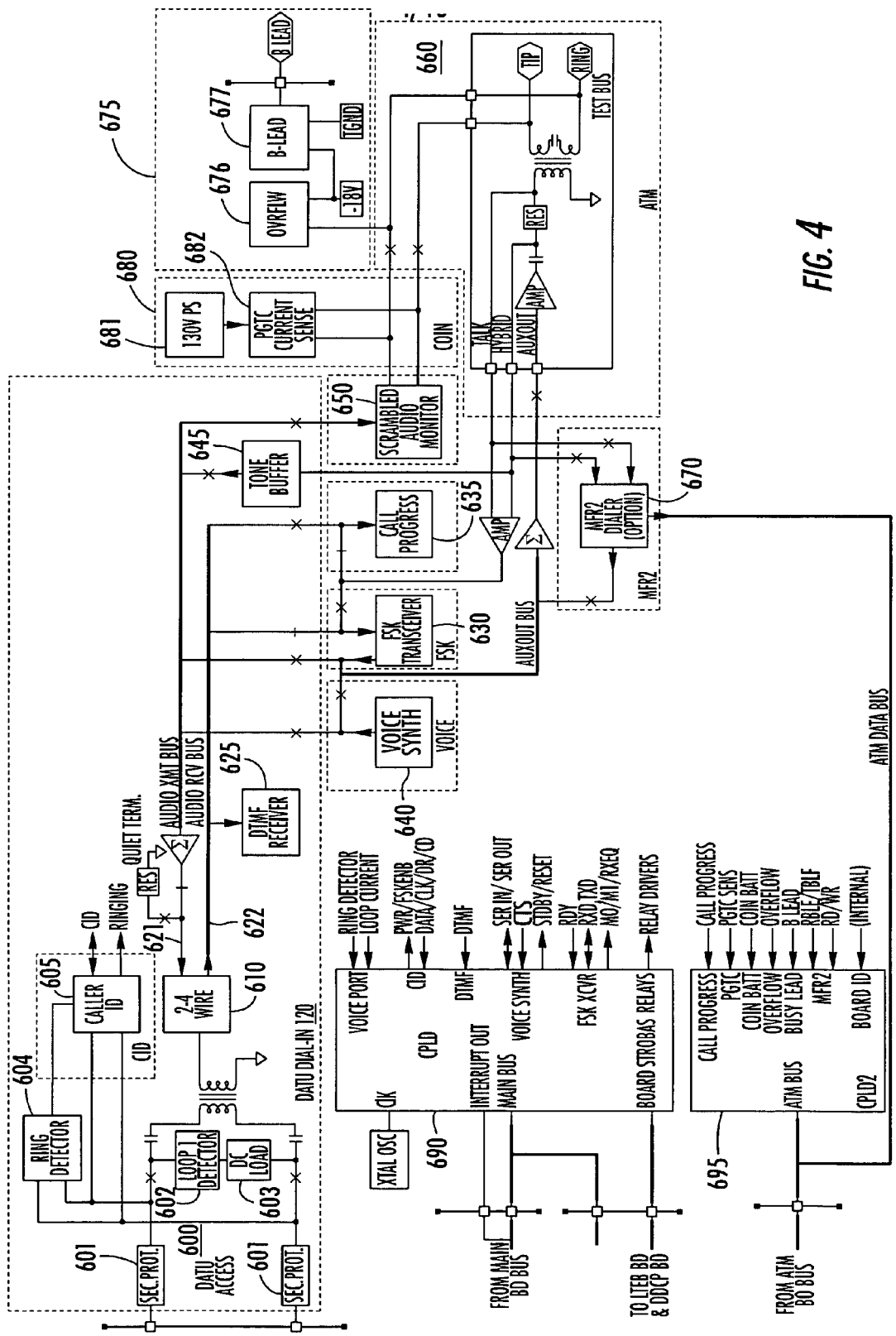
FIG. 4 diagrammatically illustrates the architecture of the multifunction unit of the DATU of FIG. 3.

Attention is now directed to FIG. 4, which shows the architecture of the multifunction unit 500. A DATU access port 600 has tip and ring conductors thereof coupled through secondary protection circuits 601 to a loop current detector 602 a DC load 603, and a ring detector 604. Following the ring detector 604 is a caller ID detector 605, which is used to identify from what number a technician has placed a call from the hand-held unit. As pointed out above, the unit also captures the name of the record and displays it if it is there. Once that has happened, the DATU will go off hook, so that it terminates the line, connecting a two-wire to four-wire interface 610, which provides AC coupling to the line.

All AC-coupling, whether audio, tones, or DTMF signaling is coupled through a bus 620 containing an audio transmit path 621 and an audio receive path 622. Signals sourced from within the unit are transported out over the audio transmit path 621, while incoming or received signals are conveyed over the audio receive path 622. The audio receive path 622 is coupled to a number of different functional components, including a DTMF receiver 625, an FSK transceiver 630 (which is connected to both the transmit bus path 621 and the receive bus path 622), and a call progress detector 635. The audio transmit path 621 is coupled to a voice synthesizer 640, the FSK transceiver 630, a tone buffer 645 and a scrambled audio monitor 650. These components are employed to perform the twelve-step test, described above, so that when the hand-held unit is taking its signaling section off the line, the DATU is taking its signal off the line.

The FSK transceiver 630 in the DATU serves the same purpose as in the hand-held unit, described above. The voice synthesizer 640 is used to generate voice instructions should there be no double-ended test call from the hand-held unit.

The DTMF receiver 625 and the call progress detector 635 operate in the same manner as in the hand-held unit. Tone buffer 645 is used to generate specific tones independent of the ATM unit.

The scrambled audio monitor circuit 650 has two pathways; one is outbound on the audio transmit bus path 621, so the person on the telephone can hear what is going on, and it has an inbound connection to a test bus 660. The test bus 660 corresponds to the North American LSSGR test trunk. In this way a connection can be made metallically to the line under test in a bridged mode, and audio traffic on the line can be monitored, while the one using the DATU can hear it. The audio is scrambled so that the listener cannot determine what is being said, but a determination can be made whether there is a conversation on the line, or whether the line has a tone on it. This allows a determination to be made as to whether the phone user has taken his receiver off hook and left it that way, or if the line is busy but there is no audio on it at all, which usually indicates a fault condition. It should be noted that the scrambled audio monitor is not used in conjunction with the double-ended tester, since it is a voice mode only function.

A test bus interface bridges this circuitry onto the trunk tip and ring pair. There is a second option in the regular world. The North American telephone networks use what is conventionally known as MFR1 signaling, which comprises two different tones per digit. The rest of the world uses another option called MFR2. The MFR2 dialer 670 provides optional dialing in this format. Coupled with the test bus 660 is an access unit 675 containing a standard overflow unit 676 and a B-lead unit 677, which are used in conjunction with a coin unit 680, containing a 130 volt power supply 681 and a pair gain test controller (PGTC) current sense unit 682. After sending it a 130 volt pulse, it may send back a signal back from a test controller which is sensed by the current sense unit. The PGTC current sense unit will sense AC signals, both tones and DC voltages, under control of the supervisory processor.

The overflow unit 676 and the B-lead unit 677 monitor different signals on the test trunk and provide a status back to supervisory processor indicating whether overflow situation was detected which is a different signal in the cells. Most of the time this means that access to the line is prevented. It is served out of another Central Office of someone receiving a number wrong.

The various function components of the unit are controlled by a pair of programmable logic devices 690 and 695. These devices serve several functions. Mostly they serve bus timing (for both the address bus and data bus), communicating between this board and the main processor, or this unit and the auxiliary test module bus. CPLD 690 goes to the main board and is a supervisory processor. CPLD2 695 performs the same functions, but connects to the ATM bus. Thus, it is used for items such as call progress, PGTC current sense, coin battery, overflow and B-lead sensing as shown.

From the foregoing it will be readily appreciated that the multifunction unit of FIG. 4 provides an interface for communications with the DATU in the Central Office. When used in conjunction with the hand-held unit which may be coupled to a line at a customer premises, what results is a fully automated double-ended test procedure that allows signaling over the same telephone line that we are about to test in a step sequence with some timing that gets exchanged between the two units, so that they controllably step back and measure at the same time, and then come back and signal at the same time.

In the DATU RAM there are a series of tables, that are controlled either through a local terminal interface on a laptop computer through a local serial port to one of the DATU UARTS, or over the local area network connection. The DATU can be queried as to what is in the table and the DATU can be supplied with new data for storage in the table. That is how the testing sequence is controlled. As pointed out above, the table can be programmed with prescribed information, such as the next step in a sequence, what step is currently being exercised, what the hand-held unit is to do, and for how long, pass/fail criteria and which analysis method will be used. When a loaded test is performed an indication is given of whether or not there are any loads. This is not a pass/fail analysis, since in the real world one can encounter a line that loads and passes, or one can encounter a line that does not have loads and passes. Most telephone companies today want to know if they have a load, since they cannot sell DSL service to without taking the loads out. The invention is able to determine if the line has a load but can be readily used for simpler service such as dial tone and long distance.

Figure 5:
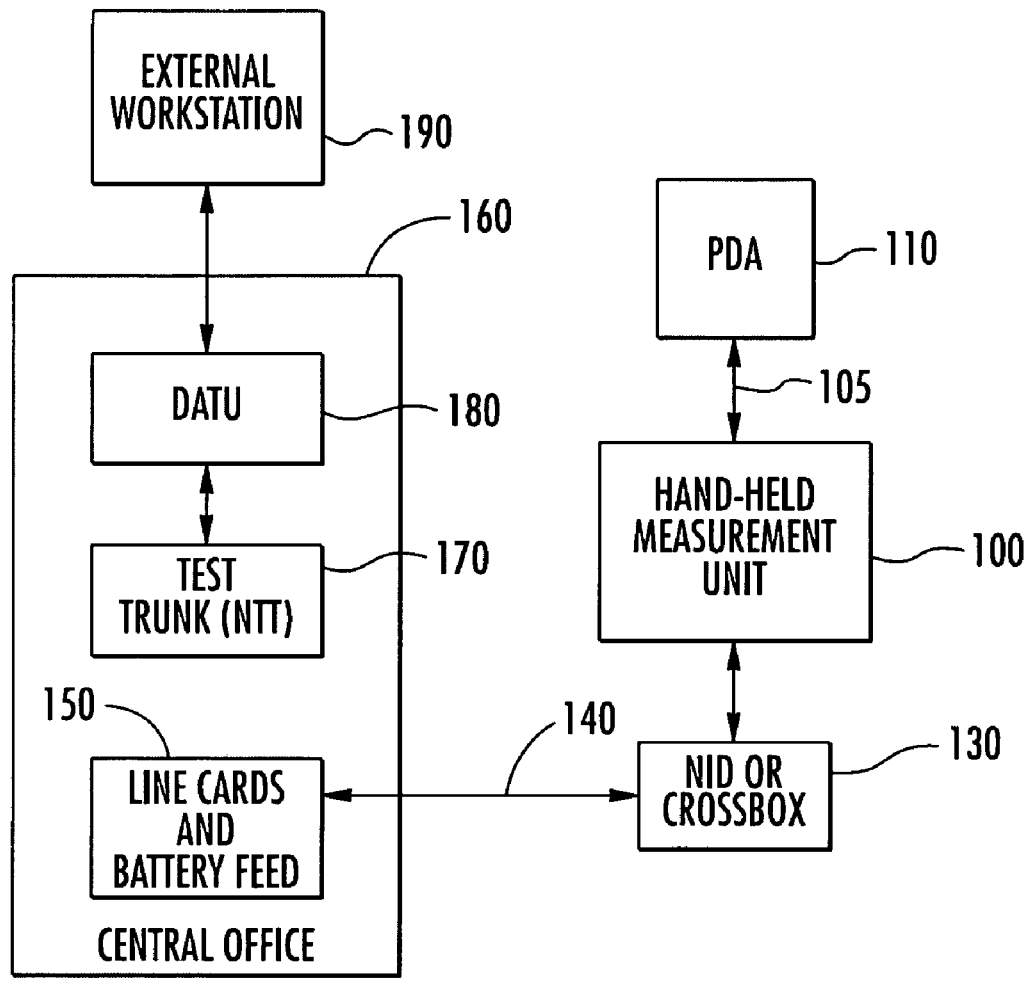
FIG. 5 shows the connection path between the hand-held unit and the line under test at an initial stage of access of the twelve-step test of the invention.

FIG. 5 shows the connections made between the hand-held unit and the line under test at an initial stage of access of the twelve-step test of the invention. As shown therein a connection is made between the hand-held unit 100 and an access point 130 to with measurements carried out from the hand-held unit to determine if it can get dial tone and call the DATU in the central office. Here, the initial connection is from the hand-held unit to the line card 150 and battery feed from the central office 160.

Figure 6:
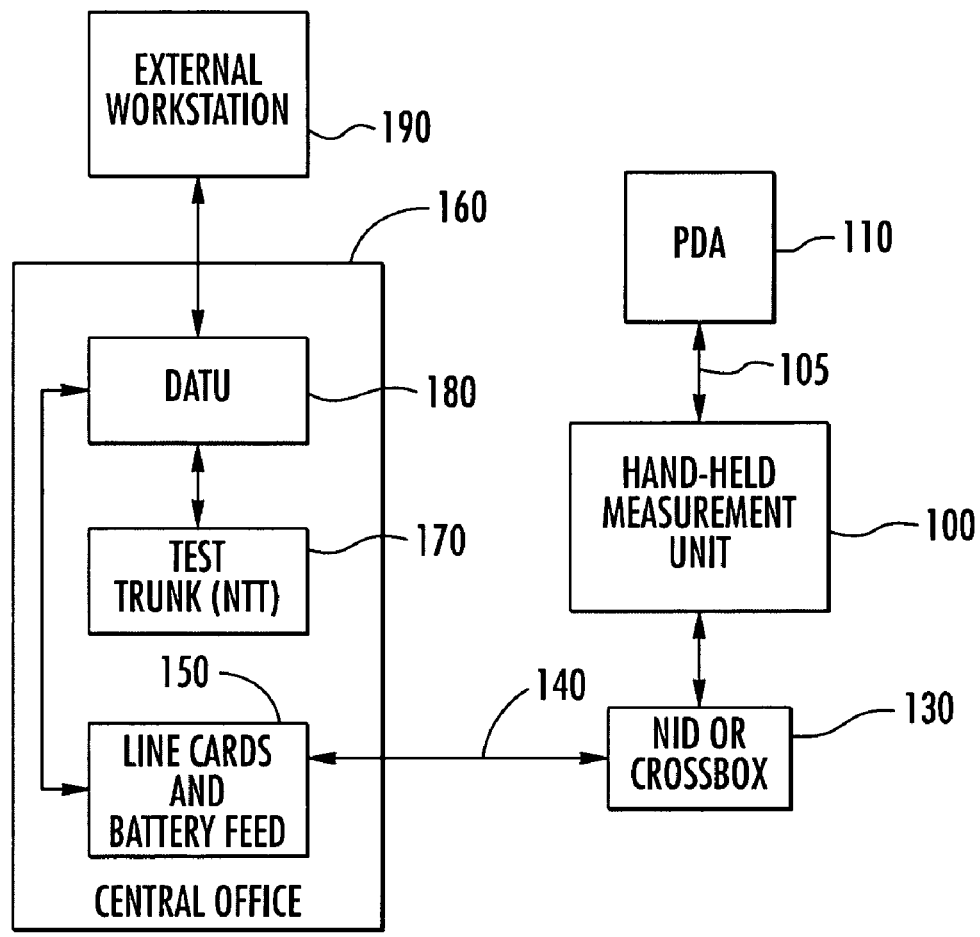
FIG. 6 shows the connection path between the hand-held unit and the line under test at an initial call-in from the hand-held unit through the regular battery card and linefeed circuit.

FIG. 6 depicts the next step, which is the initial call-in from the hand-held unit 100 through the regular battery card and linefeed circuit 150, namely, through this customer's normal audio path through the central office switch up into the DATU, and that comes in the DATU access tip and ring, to the DATUs multifunction unit 500 of FIG. 6, described above. This is where the DTMF escape sequence is dialed by the hand-held unit and captured by the multifunction unit's Call Progress Detector. Then a signal is sent to the supervisory processor informing it that a hand-held unit is trying to log in. The supervisory processor informs the multifunction unit that it may activate its FSK transceiver and send this message. Once this happens, a first set of the tests are carried out as described above.

Figure 7:
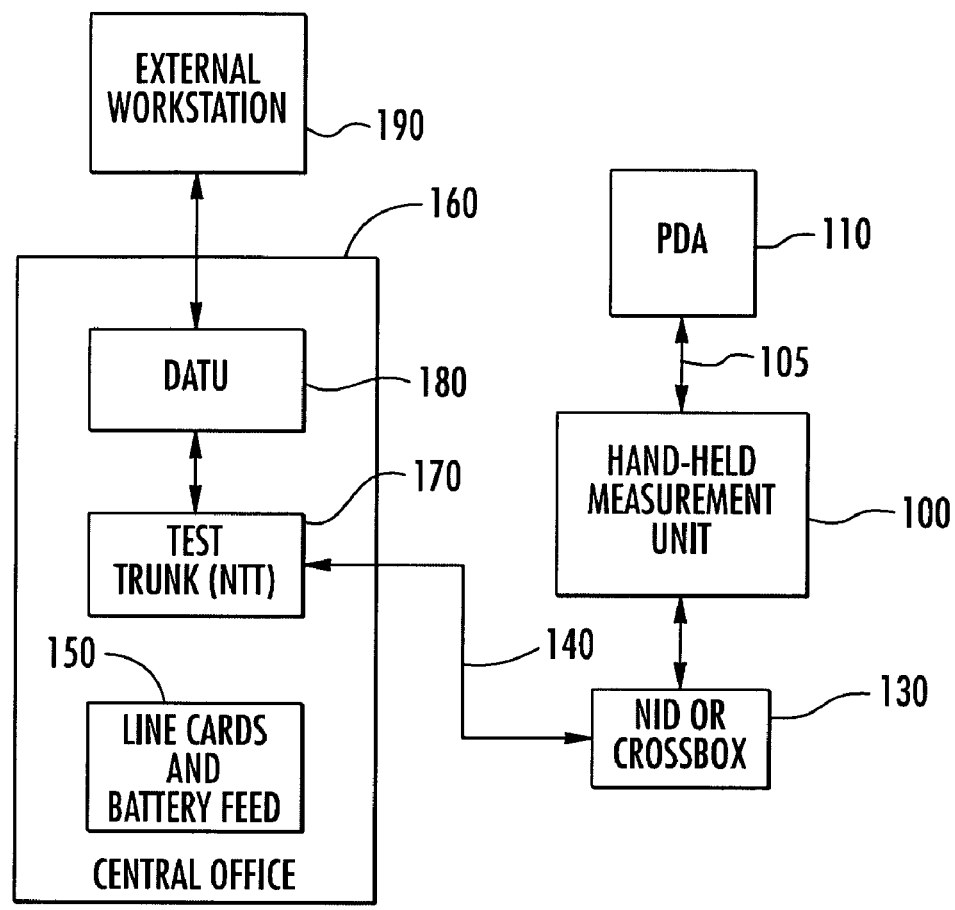
FIG. 7 shows the status of the DATU-to-hand-held unit connection at a point half way through the testing sequence, where the DATU's instructs the hand-held unit to disconnect the line, and go into high impedance monitor mode.

FIG. 7 shows the status of the DATU-to-hand-held unit connection at a point half way through the testing sequence, where the DATU's instructs the hand-held unit to disconnect the line, and go into high impedance monitor mode. The DATU accesses the line and gets battery feed and the linecard, and then disconnects so a measurement of just the cable, not the electronics, can be derived. As pointed out above, with the hand-held unit placed in a high impedance mode, the DATU goes through the Test Trunk (NTT), meaning there is no busy test performed on its behalf so it has to perform one being a DATU or an equipment talking to this. The switch will not perform a busy test. If the line is busy, it is going to do it obediently and it is incumbent upon the DATU to perform a busy test and that is why this busy test unit and IL splitter is necessary. Once that happens, the DATU sends a burst of audio tone to tell the hand-held unit, to place their FSK transceivers back on line to resume and finish the testing.

Figure 8A:
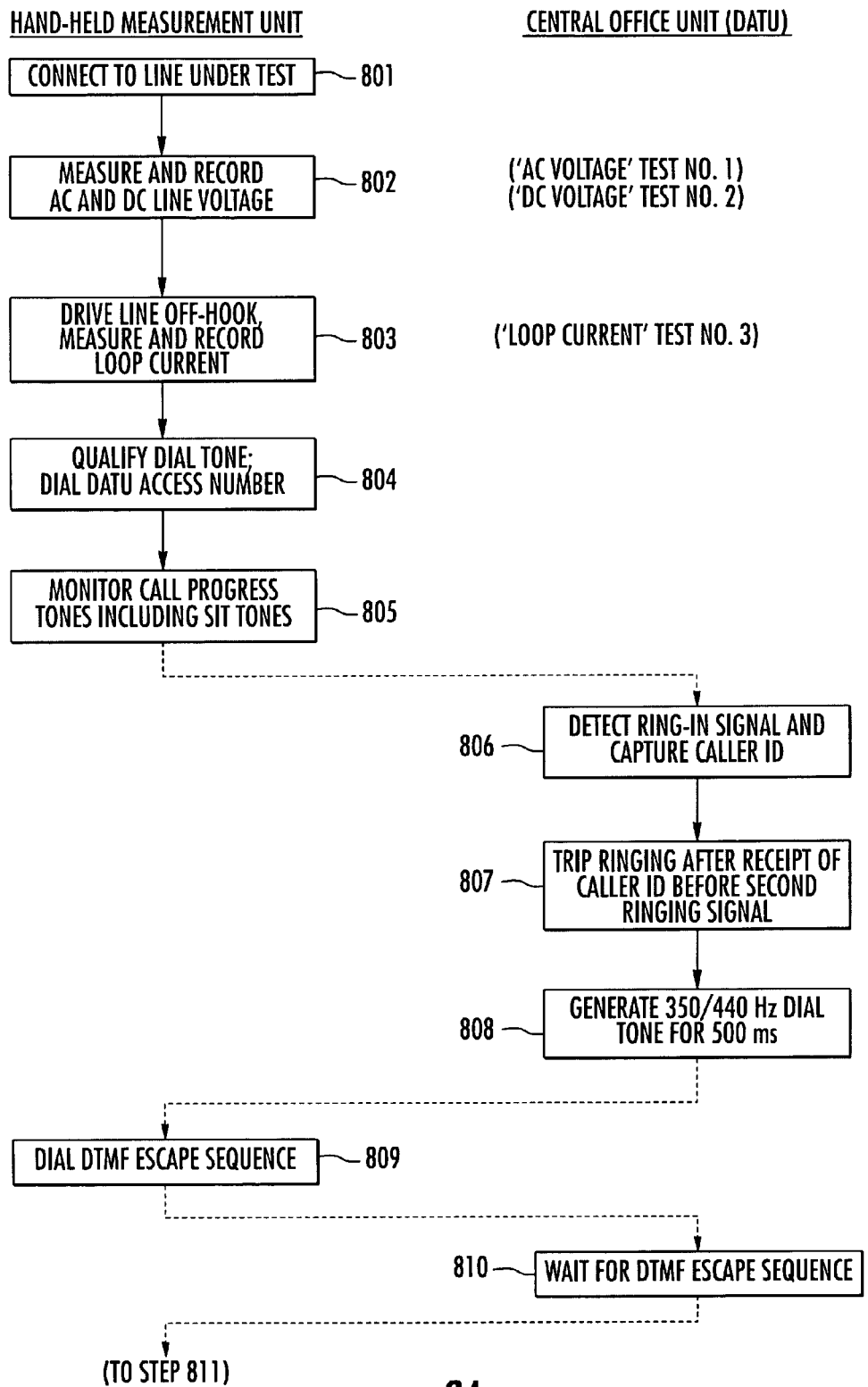
Figure 8C:
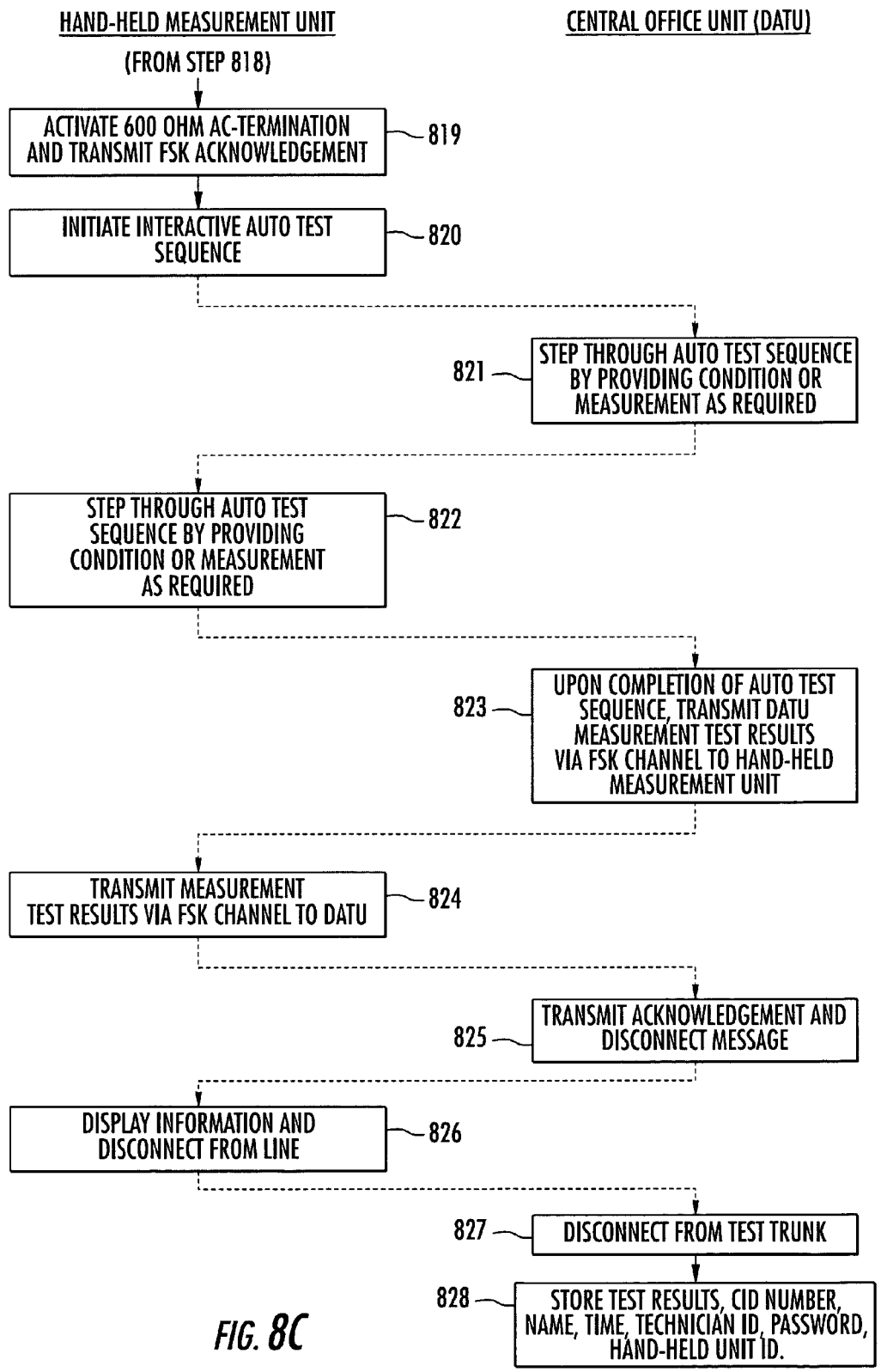

FIGS. 8A–8C are a flow chart depicting respective steps carried out by the hand-held unit 100 and the DATU in the course of their setting up a test communication sequence. At step 801, the hand-held unit is connected to the line under test. Next, in step 802, AC and DC line voltages are measured. These constitute respective 'AC Voltage' and 'DC voltage' tests Nos. 1 and 2. In step 803, the line is driven-off hook, and the loop current is measured and recorded. This constitutes the 'Loop Current' test No. 4. In step 804, dial tone is qualified and the DATU EXP access number is dialed from the hand-held unit. Once the DATU access number has been dialed, then in step 805 the hand-held unit monitors the call progress tones including SIT tones described previously.

In step 806, the DATU detects a ring-in signal from the hand-held unit and captures the caller ID. In step 807, it trips ringing after receipt of caller ID and prior to the second ringing signal. In step 808, the DATU generates a 350/440 Hz dial tone for a period of 500 ms.

Next, in step 809, the hand-held unit dials the DTMF escape sequence. In step 810, the DATU receives the DTMF escape sequence.

In step 811, the hand-held unit initiates an FSK log-in transmission during the 500 ms silent period; otherwise the DATU will proceed with a voice mode access sequence.

In step 812, the DATU transmits the received caller ID data via the FSK communication channel to the hand-held unit as an acknowledgement of the access request.

In step 813, the hand-held unit captures the caller ID FSK transmission for display on the technician's PDA screen. Next, in step 814 it transmits an FSK message to proceed or terminate.

In step 815, the DATU disconnects from the line.

In step 816, the hand-held unit disconnects from the line under test and proceeds to wait in high impedance monitor mode, for a prescribed time-out period (e.g., on the order of 30–60 seconds).

In step 817, the DATU accesses the CID identified through the test trunk and may have to retry if it encounters a busy line, as the hand-held unit may receive another call between its disconnect and access of the DATU. In step 818, the DATU transmits a wake-up message via FSK signaling over the NTT.

Next, in step 819, the hand-held unit activates a 600 ohm termination and transmits an acknowledgement to the DATU via the FSK signaling channel. In step 820, the hand-held unit begins a DATU-to-hand-held unit interactive automated test during which tests numbers 5–12 are conducted (detailed in the flow chart of FIGS. 9A–9C below).

In step 821, the DATU continues stepping through the automated test sequence by providing the appropriate condition or measurement required.

Similarly, in step 822, the hand-held unit continues stepping through the automated test sequence by providing the appropriate condition or measurement required.

In step 823, following completion of the automated test, the DATU transmits measurement test results over the FSK channel to the hand-held unit.

In step 824, following completion of the automated test, the hand-held unit transmits measurement test results over the FSK channel to the DATU.

In step 825, the DATU transmits an acknowledgement and disconnect message.

In step 826, the hand-held unit displays information to the technician and disconnects from the line.

In step 827, the DATU disconnects from the test trunk and then in step 828 it stores a number of parameters, including CID number, name, date, time, technician ID, password used, and hand-held unit model number.

Figure 9A:
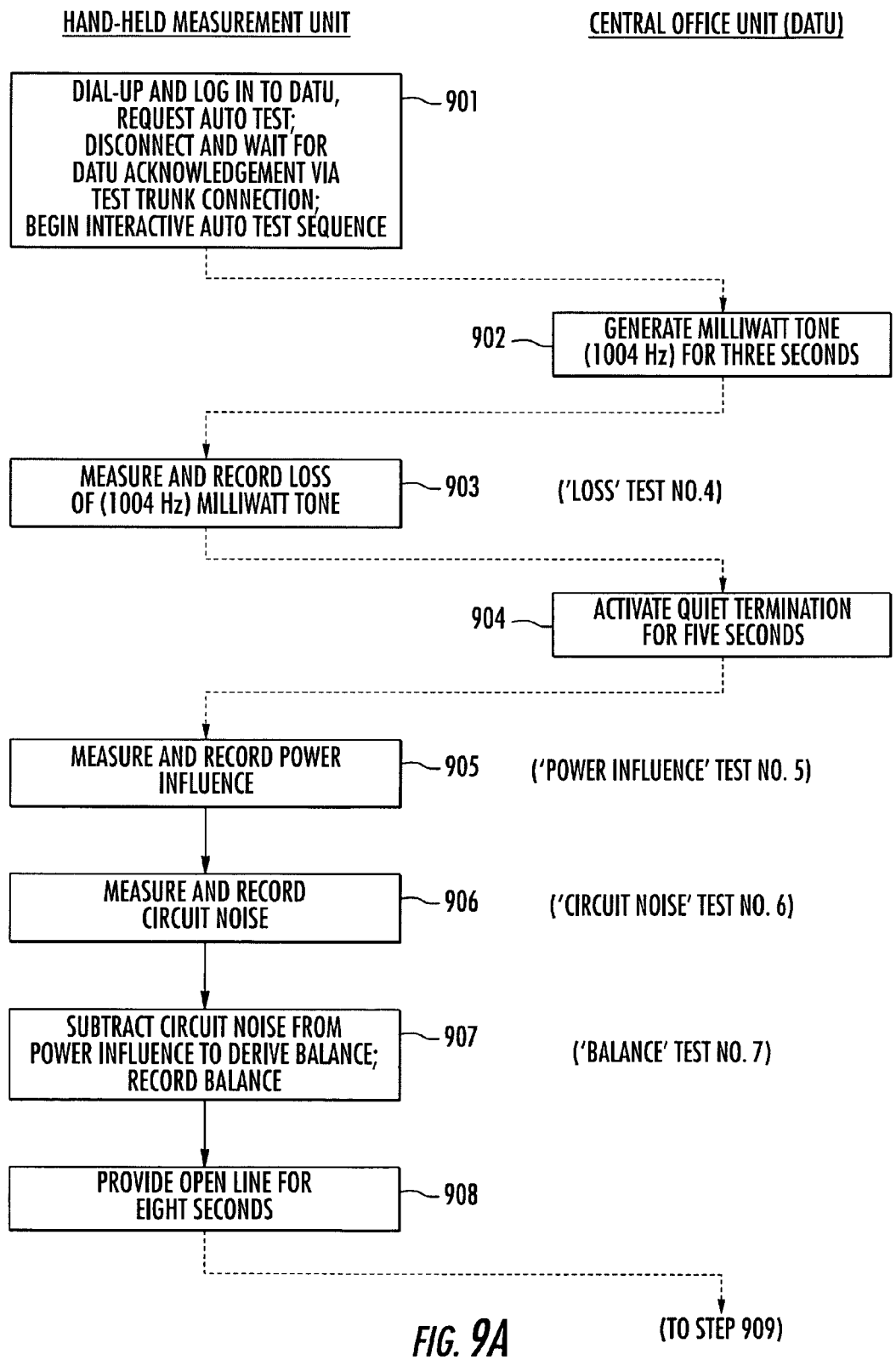
FIGS. 9A–9C are a flowchart of respective steps of the test sequence that are carried out between the hand-held unit and the DATU within the interactive automated test routine of FIGS. 8A–8C.
Figure 9B:
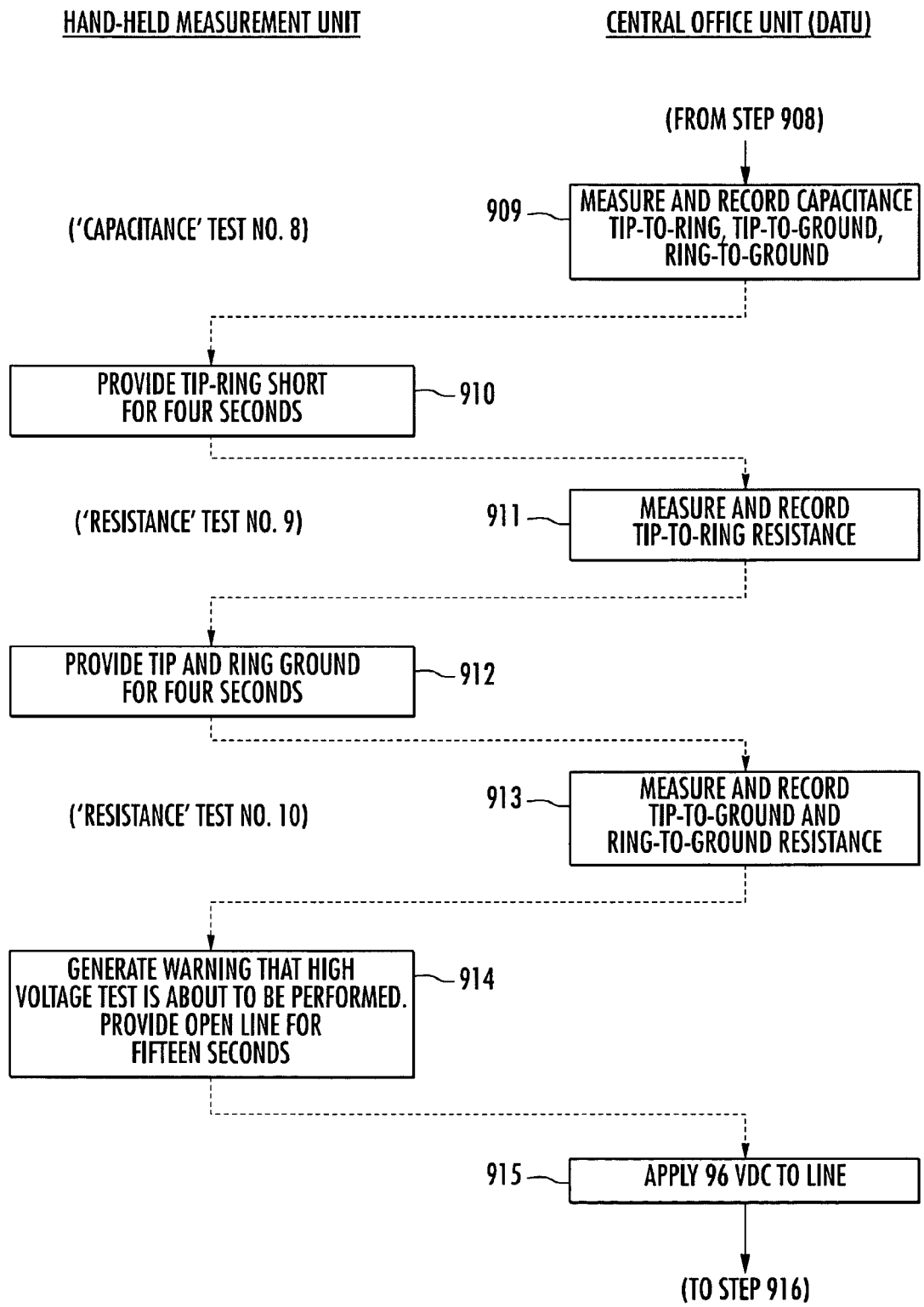
Figure 9C:
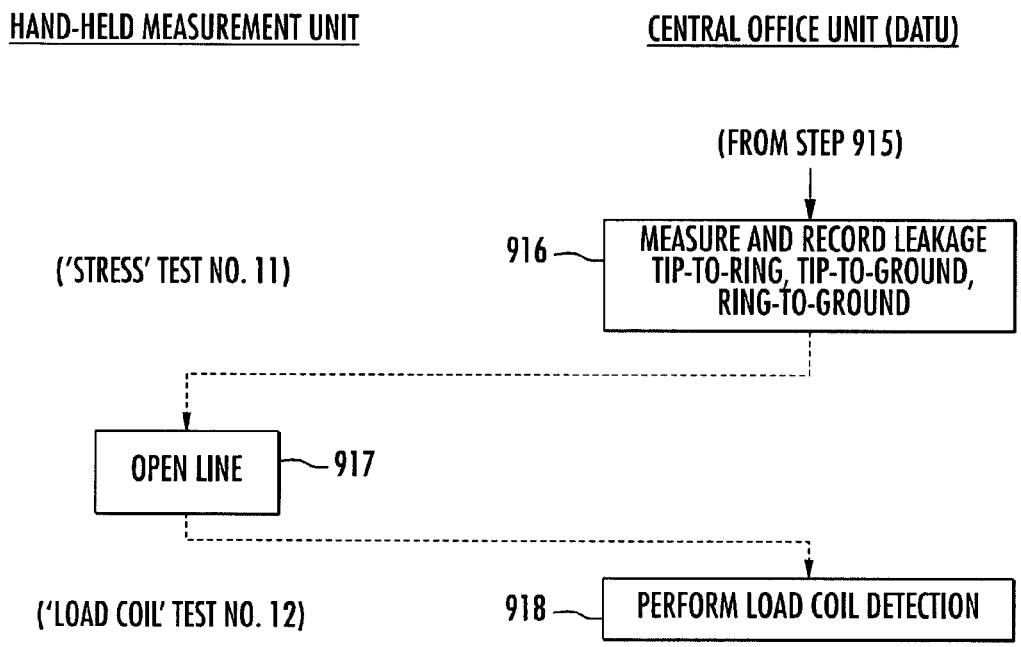

FIGS. 9A–9C are a flowchart of the respective steps carried out between the hand-held unit and the DATU within the interactive automate test routine of steps 820 and 821 in the flow sequence of FIGS. 8A–8C, described above.

The DATU-to-hand-held unit interactive portion of the test begins with step 901, wherein the hand-held unit dials-up and logs into the DATU, requests the auto test, disconnects and waits for a DATU acknowledgement message via the test trunk connection. It then begins the interactive auto test. This test requires for the DATU to generate a 1004 Hz tone signal for a prescribed period of time (e.g., a one milliwatt tone for 3 seconds) in step 902. In step 903, the hand-held unit measures and records the loss for the generated tone. This constitutes 'Loss' test No. 4.

In step 904, the DATU activates a quiet termination for five seconds. In step 905, the hand-held unit measures a records power influence (this constitutes the 'Power Influence' test No. 5); in step 906 it also measures and records circuit noise (this constitutes 'Circuit Noise' test No. 6). In step 907, the hand-held unit subtracts the circuit noise from the power influence values obtained in steps 905 and 906 to calculate and record balance (this constitutes 'Balance' test No. 7).

In step 908, the hand-held unit provides an open line for a prescribed period of time (e.g., eight seconds). This allows the DATU to perform capacitance tip-to-ring, tip-to-ground, and ring-to-ground measurements in step 909. These values are recorded and correspond to 'Capacitance' measurement step No. 8.

In step 910, the hand-held unit provides a tip-to-ring short for a prescribed time interval (e.g., four seconds). This allows the DATU to measure and record tip-to-ring resistance in step 911. This constitutes 'Resistance' measurement step No. 9.

In step 912, the hand-held unit provides tip and ring ground for a prescribed time interval (e.g., four seconds). This allows the DATU to measure and record tip-to-ground and ring-to-ground resistance in step 913. This constitutes 'Resistance' measurement step No. 10.

In step 914, the hand-held unit issues a warning to the technician that a high voltage test is about to be performed and provides an open line for fifteen seconds. In step 915, the DATU applies a high voltage (96 VDC) to the line. In step 916, it measures and records leakage from tip-to-ring, tip-to-ground and ring-to-ground. This constitutes 'Stress' test No. 11.

Finally, in step 917, the hand-held unit opens the line, to allow the DATU to conduct a load coil detection in step 918. This constitutes the 'Load Coil' test No. 12.

As will be appreciated from the foregoing description, the automated loop testing system of the present invention is capable of executing dynamically alterable, testing of telephone lines, whose service is provided on copper cable pairs. As described above, the invention provides a double-ended system level solution that performs a prescribed set of (e.g., twelve) individual tests that are executed either from a hand-held unit or by a central office test unit or by a collaboration of the two, to assist service provider and service repair organizations, to successfully address the need to rapidly and effectively repair communication services carried on copper cable pairs and to carry out these functions in the face of ongoing advances in technology, coupled with a diminishing workforce. The invention is particularly useful by telephone installation and repair technicians during the course of their quantifying and qualifying cable pairs for use by telephone line subscribers.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. An arrangement for testing a telephone line comprising:
a hand-held measurement unit containing communication and test interface circuitry that is configured to be coupled to a telephone wireline and is arranged to engage a personal digital assistant type device, said hand-held measurement unit being controllably operative to participate in testing of characteristics of said telephone wireline; and
a test unit installed in a telephone service facility and containing communication and test interface circuitry that is configured to be coupled to said telephone wireline, and is controllably operative to participate with said hand-held measurement unit in testing characteristics of said telephone wireline.

2. The arrangement according to claim 1, wherein said hand-held measurement unit and said test unit are controllably operative to exchange test control messages with one another that are effective to cause a selected electrical condition to be applied to a first portion of said wireline by one of said hand-held measurement unit and said test unit, and to cause a prescribed electrical measurement to be made at a second portion of said wireline by another of said hand-held measurement unit and said test unit, in response to said selected electrical condition.

3. The arrangement according to claim 2, wherein said hand-held measurement unit is operative to exchange test control messages with said test unit by means of a test trunk.

4. The arrangement according to claim 1, wherein said hand-held measurement unit is further operative to couple test interface circuitry thereof to said telephone wireline, and to measure preselected parameters of said telephone wireline independent of participation of said test unit in measuring said preselected parameters of said telephone wireline.

5. The arrangement according to claim 4, wherein said preselected parameters include at least one of AC voltage, DC voltage and loop current.

6. The arrangement according to claim 1, wherein characteristics of said telephone wireline, testing of which is performed by participation of both said hand-held measurement unit and said test unit, include at least one of tone loss, power influence, circuit noise, balance, capacitance, stress and load coil detection.

7. The arrangement according to claim 1, wherein said hand-held measurement unit and said test unit are operative to exchange frequency shift keying (FSK)-based messages which are effective to control testing of said wireline.

8. The arrangement according to claim 7, wherein said hand-held measurement unit is operative to initiate an FSK log-in transmission containing caller ID information, in response to which said test unit transmits the received caller ID information via an FSK communication channel to said hand-held measurement unit as an acknowledgement of an access request, said the hand-held measurement unit capturing and displaying said caller ID information transmitted over said FSK communication channel from said test unit.

9. A portable test device for testing a telephone line comprising:
a hand-held measurement unit containing communication and test interface circuitry that is configured to be coupled to a telephone wireline and is arranged to engage a personal digital assistant type device, said hand-held measurement unit being controllably operative to test characteristics of said telephone wireline;
a personal digital assistant type device through which control inputs and outputs are interfaced with a user of said portable test device; and wherein
said hand-held measurement unit is operative, for a first mode of operation, to couple test interface circuitry thereof to said telephone wireline, and independently measure preselected parameters of said telephone wireline, and for a second mode of operation, to exchange test control messages with a test unit in a telephone service facility, and to participate with test interface circuitry of said test unit in testing characteristics of said telephone wireline.

10. The portable test device according to claim 9, wherein said preselected parameters include at least one of AC voltage, DC voltage and loop current.

11. The portable test device according to claim 9, wherein said hand-held measurement unit and said test unit are controllably operative to exchange test control messages with one another that are effective to cause a selected electrical condition to be applied to a first portion of said wireline by one of said hand-held measurement unit and said test unit, and to cause a prescribed electrical measurement to be made at a second portion of said wireline by another of said hand-held measurement unit and said test unit, in response to said selected electrical condition.

12. The portable test device according to claim 11, wherein said hand-held measurement unit is operative to exchange test control messages with said test unit by means of a test trunk.

13. The portable test device according to claim 11, wherein characteristics of said telephone wireline, testing of which is performed by participation of both said hand-held measurement unit and said test unit, include at least one of tone loss, power influence, circuit noise, balance, capacitance, resistance, stress and load coil detection.

14. The portable test device according to claim 9, wherein said hand-held measurement unit and said test unit are operative to exchange frequency shift keying (FSK)-based messages which are effective to control testing of said wireline.

15. A method of testing a telephone line comprising the steps of:
(a) providing a hand-held measurement unit containing communication and test interface circuitry that is configured to be coupled to a telephone wireline and is arranged to engage a personal digital assistant type device, said hand-held measurement unit being controllably operative to participate in testing of characteristics of said telephone wireline;
(b) providing a test unit in a telephone service facility and containing communication and test interface circuitry that is configured to be coupled to said telephone wireline, and is controllably operative to participate with said hand-held measurement unit in testing characteristics of said telephone wireline;
(c) coupling said hand-held measurement unit to said telephone wireline and exchanging test control communication messages between said hand-held measurement unit and said test unit, so as to establish test connectivity paths between said wireline and each of said hand-held measurement unit and said test unit; and
(d) testing characteristics of said telephone wireline by means of at least said hand-held measurement unit.

16. The method according to claim 15, wherein step (c) comprises causing said hand-held measurement unit and said test unit to exchange test control messages with one another that are effective to cause a selected electrical condition to be applied to a first portion of said wireline by one of said hand-held measurement unit and said test unit, and to cause a prescribed electrical measurement to be made at a second portion of said wireline by another of said hand-held measurement unit and said test unit, in response to said selected electrical condition.

17. The method according to claim 16, wherein said hand-held measurement unit is operative to exchange test control messages with said test unit by means of a test trunk.

18. The method according to claim 15, wherein step (d) comprises coupling test interface circuitry of said hand-held measurement unit to said telephone wireline, and measuring preselected parameters of said telephone wireline independent of participation of said test unit in measuring said preselected parameters of said telephone wireline.

19. The method according to claim 18, wherein said preselected parameters include at least one of AC voltage, DC voltage and loop current.

20. The method according to claim 15, wherein characteristics of said telephone wireline, testing of which is performed by participation of both said hand-held measurement unit and said test unit, include at least one of tone loss, power influence, circuit noise, balance, capacitance, resistance, stress and load coil detection.

21. The method according to claim 15, wherein said hand-held measurement unit and said test unit are operative to exchange frequency shift keying (FSK)-based messages which are effective to control testing of said wireline.

* * * * *